(12) United States Patent
Usui et al.

(10) Patent No.: US 7,106,821 B2
(45) Date of Patent: Sep. 12, 2006

(54) DATA MODULATION METHOD, DATA MODULATION DEVICE AND COMMUNICATION DEVICE

(75) Inventors: Takashi Usui, Tokyo (JP); Ralf Boehnke, Stuttgart (DE); Thomas Doelle, Stuttgart (DE); Tino Konschak, Stuttgart (DE)

(73) Assignees: Sony Corporation, (JP); Sony Deutschland GmbH, (DE)

( * ) Notice: Subject to any disclaimer, the term of this patent is extended or adjusted under 35 U.S.C. 154(b) by 508 days.

(21) Appl. No.: 09/804,744

(22) Filed: Mar. 13, 2001

(65) Prior Publication Data
US 2002/0094050 A1    Jul. 18, 2002

(30) Foreign Application Priority Data
Mar. 15, 2000  (JP)  ............................ P2000-077857

(51) Int. Cl.
*H04L 25/38*  (2006.01)
*H04L 7/00*   (2006.01)
*H04J 3/06*   (2006.01)

(52) U.S. Cl. ...................... 375/368; 375/358; 375/357; 370/509

(58) Field of Classification Search ................ 370/509, 370/510, 203, 514; 375/368, 357, 358
See application file for complete search history.

(56) References Cited
U.S. PATENT DOCUMENTS
5,596,582 A * 1/1997 Sato et al. .................. 370/509

6,160,821 A  * 12/2000 Dolle et al. .................. 370/509
6,175,391 B1 *  1/2001 Kwak .......................... 348/725
6,191,903 B1 *  2/2001 Fujimoto et al. ............. 360/48
6,332,009 B1 * 12/2001 Olafsson ..................... 375/358
6,515,960 B1 *  2/2003 Usui et al. .................. 370/203

OTHER PUBLICATIONS

Orthogonal frequency division multiplex synchronisation techniques for wireless local area networks Keller, T.; Hanzo, L.;Personal, Indoor and Mobile Radio Communications, 1996. PIMRC'96., vol. 3, Oct. 15-18, 1996 pp. 963-967 vol. 3.*

(Continued)

*Primary Examiner*—Khai Tran
*Assistant Examiner*—Cicely Ware
(74) *Attorney, Agent, or Firm*—Lerner, David, Littenberg, Krumholz & Mentlik, LLP

(57) ABSTRACT

A data modulation method and a data modulation device and a communication device are disclosed. The present invention relates to the synchronization and training preamble. The reference symbol optimized in order to contain the structure of "IA-A-IA-A-A-IA-A-IA-IA" is allocated to sub-carriers of the OFDM symbol. More specifically, by designing the structure of the preamble of the time domain, distinction from the other communication system can be certainly conducted holding the correctness of the clock synchronization. Also, we have adopted the series having low peak average ratio and dynamic range of sync symbol using the OFDM. Since the generation and the detection processings can be conducted in utilizing the generation device and the detection device of the sync preamble used in the convention system, this system has an advantage in increasing the common use of the LSI chip. We have made the sync series divided into 2 parts A and B before to one B region and made this to have simple construction.

12 Claims, 31 Drawing Sheets

OTHER PUBLICATIONS

Orthogonal frequency division multiplex synchronisation techniques for wireless local area networks Keller, T.; Hanzo, L.;Personal, Indoor and Mobile Radio Communications, 1996. PIMRC'96., vol. 3 , Oct. 15-18, 1996 pp. 963-967 vol. 3.*

* cited by examiner

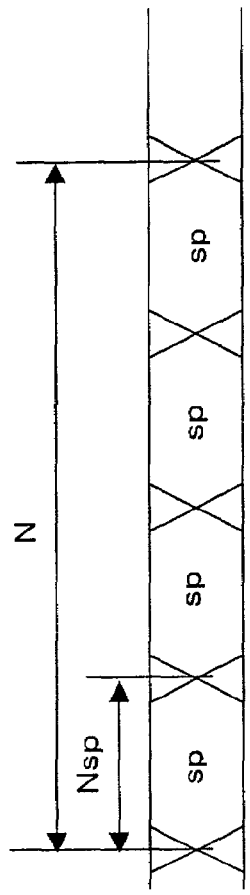
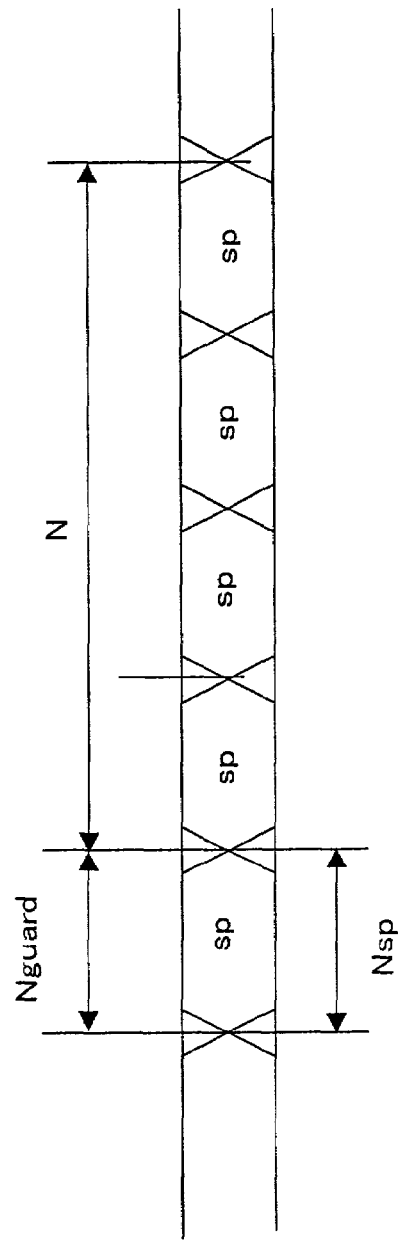
FIG. 2A (PRIOR ART)
FIG. 2B (PRIOR ART)

IEEE802.11a : B16x10+C32+C64x2

| B16 | B16 | B16 | B16 | B16 | B16 | B16 | B16 | B16 | B16 | C32 | C64 | C64 |

FIG. 4 (PRIOR ART)

BRAN BCH : A16x5+B16x5+C32+C64x2

| A16 | IA16 | A16 | IA16 | IA16 | B16 | B16 | B16 | B16 | IB16 | C32 | C64 | C64 |

FIG. 6 (PRIOR ART)

BRAN UL : B16x10+C32+C64x2

| B16 | B16 | B16 | B16 | B16 | B16 | B16 | B16 | B16 | IB16 | C32 | C64 | C64 |

FIG. 8 (PRIOR ART)

HI SWAN UL : B16x5+A16x5+C32+C64x2

| B16 | B16 | B16 | IB16 | A16 | IA16 | A16 | IA16 | IA16 | C32 | C64 | C64 |

FIG. 10 (PRIOR ART)

| REFERENCE SYMBOL | IEEE802.11a | BRAN BCH | BRAN UL | HISWAN UL |
|---|---|---|---|---|
| NUMBER OF PEAKS | 1 (PLAIN) | 2 | 1 (PLAIN) | 2 |
| CODE OF REAL PART | + | −+ | + | +− |

FIG. 15 (PRIOR ART)

WHL (2) : B16x9+C16+C64x2

| IB16 | IB16 | IB16 | B16 | B16 | B16 | IB16 | C16 | C64 | C64 |

FIG. 20

| REFERENCE SYMBOL | SERIES (1) | SERIES (2) |
|---|---|---|
| NUMBER OF PEAKS | 2 | 2 |
| CODE OF REAL PART | −→− | +→+ |

WHL (1) : A16×9+X16+C16+C64×2

| IA16 | A16 | IA16 | A16 | IA16 | A16 | IA16 | X | C16 | C64 | C64 |

FIG. 34A

WHL (1) : X16+A16×9+C16+C64×2

| X | IA16 | A16 | IA16 | A16 | IA16 | A16 | IA16 | C16 | C64 | C64 |

FIG. 34B

WHL (2) : B16x9+X16+C16+C64x2

| IB16 | IB16 | IB16 | IB16 | B16 | B16 | B16 | B16 | IB16 | X | C16 | C64 | C64 |

FIG. 35A

WHL (2) : X16+B16x9+C16+C64x2

| X | IB16 | IB16 | IB16 | IB16 | B16 | B16 | B16 | B16 | IB16 | C16 | C64 | C64 |

FIG. 35B

DATA MODULATION METHOD, DATA MODULATION DEVICE AND COMMUNICATION DEVICE

BACKGROUND OF THE INVENTION

1. Field of the Invention

The present invention relates to a data modulation method and a data modulation device and a communication device, and more particularly is suitably applied to the digital communication system using such as the orthogonal frequency division multiplexing (OFDM) system to acquire synchronism of frame and packet by using synchronizing code series (hereinafter referred to as reference symbol) when receiving signals.

2. Description of the Related Art

In recent years, with the development of OFDM digital communication system, various standardization committees have been developing the standardization of these systems. And it is expected that the OFDM system digital communications systems standardized by these different standardization committees will be used in the same frequency band mixed in the near future.

In practice, in the digital communication system of OFDM system, the Institute of Electrical Electronics Engineers (IEEE) 802.11a formed the specification (P802.11a/D7.0 July 1999) and has been promoting for the standardization. And at the same time, the Broadband Radio Access Network (BRAN) has formed the specification (<DTS/BRAN03003-1>V0.j(1999-09)) and has been promoting for the standardization.

Furthermore, the High-speed Wireless Access Council/Wireless Access Group has already formed the specification "Multimedia Mobile Access Communication (MMAC) Systems specification Ver.1.1, H11.11.11 44-4" and been promoting for standardization, and simultaneously, the 5 GHz Band Mobile Access Special Council/Asynchronous Transfer Mode (ATM) Group forms "Multimedia Mobile Access Communication (MMAC) systems specification) Ver.1,1, H11.11.11 44-4" and has been working for its standardization.

In addition to these, presently the system to make the IEEE1394 to wireless, "wireless home link" as the digital communication system of the OFDM system, has been under the process of standardization in Japan.

The synchronization method in the digital communication system of the OFDM system standardized by the IEEE802.11a, BRAN, High-Speed Wireless Access Council/Wireless Access Group, and the 5 GHz Band Mobile Access Special Council/ATM Group described above has been already decided.

On the other hand, although in the synchronization method in the digital communication system of OFDM system using the wireless home link, the synchronization method has not been determined, it is proposed to define the reference symbols different from other 4 digital communication systems.

At this point, the structure of the conventional synchronization method and the reference symbol will be described. In the digital communication system, generally the transmitting side and the receiving side are operating in synchronism. More specifically, it is necessary to synchronize the timing and frequency between the transmitter and the receiver. For example, the symbol timing of the fast Fourier transform (FFT) unit should be synchronized.

In general, in order to synchronize the symbol having the specific timing sequence, that is the reference symbol, is to be transmitted. This reference symbol is transmitted overlaying onto the data to be transmitted.

In practice, as shown in FIG. 1, the reference symbol is interpolated to the head of transmission frame formed of F number of symbols, i.e., burst frame, as the head symbol and is transmitted. In this connection, guard intervals are provided between the reference symbol and the head data symbol #1, and between each of data symbols in order that interference between symbols (this is expressed as intersymbol interference, and hereinafter referred to as ISI) would not occur under the multi-bus condition.

Then, the identification of reference symbol in the receiving side, that is the timing in synchronism, will be determined according to the correlation on the time axis between the receiving signal in which reference symbol is included and the receiving signal delayed.

The maximum value of that correlation value is used to take synchronism in order to fit to the position of the last sample of the reference symbol as correctly as possible. In this connection, the reference symbol is formed of a plurality of synchronization patterns (hereinafter referred to as SP) in order to detect the maximum value of correlation value, and the SP appears several times in one reference symbol period.

FIGS. 2A and 2B show the construction or format of the reference symbol having the length N in which the SP with the length Nsp on the time axis is repeated N/Nsp times.

For example, in the digital communication system of the OFDM system, the symbol having the desired structure can be formed effectively by inverse fast Fourier transforming (hereinafter referred to as IFFT) the coefficient of the discrete Fourier transformation (hereinafter referred to as DFT).

Accordingly, in order to form the reference symbol of the length Ts having (N/Nsp) numbers of sync patterns to be expressed in the following equation, it is enough to modulate DFT coefficient of every (N/Nsp) order (sub-carrier of every (N/Nsp) order in the frequency region).

$$T_s * \left[\frac{N_{sp}}{N}\right] \tag{1}$$

For example, when N=64, Nsp=16, only subcarrier of ±4, ±8... may be modulated.

In this connection, N shows the total number of samples in one reference symbol, i.e., one cycle of the reference symbol, and Nguard shows the number of samples in the guard section inserted to prevent the interference between symbols (ISI).

Moreover, the period of correlation window will be expressed as follows:

$$N+N_{guard}-N_{sp} \tag{2}$$

Then, the correlation value R(i) in the time area of input data stream will be expressed in the following equation.

$$R(i) = \sum_{n=0}^{N+N_{guard}-N_{sp}-1} y(i-n) \cdot y*(i-n-N_{sp}) \tag{3}$$

As is expressed above, the correlation value is, after multiplying the receiving signal by its conjugate complex signal, these are multiplied by the number of samples included in the correlation window.

At this point, the circuit construction for calculating the correlation value R(i) according to EQUATION (3) will be shown in FIG. 3. As this FIG. 3 shows, the input data (i.e., received data) is supplied to the delayer 81 and a multiplier 83, and the delayer 81 delays this input data for Nsp, i.e., 1 sync pattern, and supplies this to the conjugate complex function device 82.

The conjugate complex function device 82 supplies the input data delayed at the delayer 81 to the multiplier 83 searching for conjugate complex data. The multiplier 83 multiplies the input data by the conjugate complex data supplied from the conjugate complex function device 82, and supplies the resulting multiplied data to the delayer 84 and the adder 85.

The delayer 84, delaying the multiplied data for the period of correlation window, supplies this to the subtracter 86. This subtracter 86 is supplied with output data of the adder 85, and the subtracter 86 subtracts the multiplied data delayed at the delayer 84 from this output data, and supplies the resulting subtracted data to the delayer 87 having the delay time of 1 unit. The delayer 87, delaying the subtracted data, supplies this to the adder 85. The adder 85 adds the multiplied data from the multiplier 83 and the subtracted data delayed at the delayer 87 and supplies the resulting output data to the subtracter 86.

Thus, the received data is correlated with itself delayed for the period of sync pattern. And the correlation value R(i) is accumulated during the period of correlation window. The maximum value of the absolute value (|R(i)|) of the correlation value R(i), that is the output of the subtracter 86 is detected by the maximum value detection circuit (not shown in FIG. 3) Accordingly, the timing position of the last sample of the reference symbol to be received will be determined. Then, this time information is used as the symbol timing signal of the receiver.

In this case, the value of correlation R(i) expressed by the accumulation value shown in EQUATION (3) will become the maximum at a certain position to be described later. And by detecting the maximum value, the correct symbol timing in the receiver will be determined. In this connection, the detection of the maximum value of correlation value R(i) is conducted only by the reference symbol.

Furthermore, the determination whether the current symbol is the reference symbol or not is conducted based on the predetermined threshold value. More specifically, the maximum value of the absolute value |R(i)| while the absolute value |R(i)| of the correlation-value R(i) exceeds its threshold value is taken as the detection of reference symbol and the synchronization timing.

In this connection, the detection method of frequency offset and the effects of phase shift are described in the Japan Patent Application No. 10-330208 (Japan Patent Laid-Open No. 11-215097 bulletin) described above. And based on such method, the sync code series has been optimized and being used in the conventional digital communication system.

At this point, the generation method of the conventional reference symbol will be described in the following paragraph. All reference symbols are generated using 64-point IFFT. There are three kinds of complex number sequences in the input code sequence of IFFT, and these are named as SA, SB and SC respectively. In this connection, contents of SA, SB and SC will be shown in the EQUATION (4), EQUATION (5) and EQUATION (6) as follows:

$$SA_{-26,26} = \sqrt{(13/6)} * \begin{matrix} \{0, 0, 0, 0, S1, 0, 0, 0, S2, 0, 0, 0, \\ S3, 0, 0, 0, S4, 0, 0, 0, S5, 0, 0, 0, \\ S6, 0, 0, 0, S7, 0, 0, 0, S8, 0, 0, 0, \\ S9, 0, 0, 0, S10, 0, 0, 0, S11, \\ 0, 0, 0, S12, 0, 0, 0, 0\} \end{matrix} \quad (4)$$

$$S1\ldots 12 = \begin{matrix} (-1+j), (1+j), (+1-j), (-1-j), (-1+j), \\ (-1-j), (-1+j), (-1-j), (-1+j), (-1-j), \\ (1-j), (1+j) \end{matrix}$$

$$SB_{26\ldots 26} = \sqrt{(13/6)} * \begin{matrix} \{0, 0, 1+j, 0, 0, 0, -1-j, 0, 0, 0, \\ 1+j, 0, 0, 0, -1-j, 0, 0, 0, \\ -1-j, 0, 0, 0, 1+j, 0, 0, 0, 0, 0, 0, 0, \\ -1-j, 0, 0, 0, -1-j, 0, 0, 0, 1+j, \\ 0, 0, 0, 1+j, 0, 0, 0, 1+j, 0, 0, 0, \\ 1+j, 0, 0\} \end{matrix} \quad (5)$$

$$SB_{-26\ldots 26} = \begin{matrix} \{+1, +1, -1, -1, +1, +1, -1, +1, -1, +1, \\ -1, +1, +1, +1, +1, +1, +1, -1, -1, +1, \\ +1, -1, +1, -1, +1, +1, +1, 0, +1, -1, \\ -1, +1, +1, -1, +1, -1, +1, -1, -1, -1, \\ -1, -1, +1, +1, -1, -1, +1, -1, +1, -1, \\ +1, +1, +1, +1\} \end{matrix} \quad (6)$$

Contents of SA, SB and SC are shown as above.

The series A is the unit of the repetition of first 16 samples in the output signal to be put out from the IFFT when the SA is entered into the IFFT.

Furthermore, the series B is the unit of repetition of the first 16 samples in the output signal to be put out from the IFFT when the SB is entered into the IFFT.

Furthermore, the series C is the unit of repetition of 64 samples of output signal to transmitted from the IFFT or 16 samples going back to the past along the time axis from the last one of the 64 samples when SC is entered into the IFFT.

The reference symbol of each digital communication system is comprised of the series A and series B combined.

In this connection, in IEEE802.11a, the reference symbol is formed as shown in FIG. 4, and the reference symbol shows the waveform as shown in FIG. 5. Moreover, in the BRAN for BCH, the reference symbol is formed as shown in FIG. 6, and the reference symbol shows the waveform as shown in FIG. 7. Furthermore, in the BRAN for UL, the reference symbol is formed as shown in FIG. 8, and the reference symbol shows the waveform as shown in FIG. 9. And in the high speed wireless access system (HISWAN) for UL, the reference symbol is formed as shown in FIG. 10, and the reference symbol shows the waveform as shown in FIG. 11.

Incidentally, in order to detect the reference symbol, the sync detection using the correlator having the construction shown in FIG. 19 has been invented, not having the construction of the reference symbol. And since C region of the reference symbol is used for assuming the transmission path, same waveform is used commonly in all digital communication systems.

At this point, the amplitude of correlator output (the top stage) takes the value from 0 to 1. The plain 1 value continues and the shape having sharp peaks appears. However, these waveforms differ slightly from each other. The amplitudes of the real part and the imaginary part are shown in the middle stage and the lower stage. The real part takes the value from +1 to −1, and according to the combination of codes at the peak position of the top stage, the difference of preamble occurs as shown in FIG. 15.

However, although it is difficult to differentiate between the IEEE802.11a and the UL of BRAN, the distinction between the IEEE802.11a and the BCH of BRAN is possible, and it is considered that this causes no problem. The imaginary part takes the value of 0. If the frequency difference occurs, the imaginary part gets the value, and thus, the frequency difference trap will be conducted to make this value 0 as described in the Japanese Patent Application No. 10-330208 (Japan Patent Laid-Open No. 11-215097 bulletin).

Next, a flow of the general synchronizing operation and the OFDM demodulation operation will be shown in FIG. 16. In FIG. 16, firstly, the existence of signal will be detected by detecting the reference symbol. This is not only the detection of signal existence by detecting the electric power of the received signal, but also, by detecting the signal waveform pattern specific to the digital communication system, we can know that the signal is the communicating party of our digital communication system. Then, after the detection of reference symbol is being conducted, the data demodulation will be conducted according to the OFDM system.

In the conventional digital communication system of the OFDM system, there are two problems and these will be described in the following paragraphs.

Firstly, as the first problem supposing that the same reference symbol is used in all digital communication systems, these would not be known as different digital communication systems after these are demodulated by the OFDM system. Thus, this causes a problem that the wireless terminal has to conduct the time-wasting operation.

Furthermore, in the case where the OFDM systems of different digital communication systems are different systems, frames can be synchronized but the signal cannot be demodulated by the OFDM system. As a result, the sync signal arrived cannot be identified as to whether it is for the wireless home link or the high speed wireless access and the hang-up may occur.

Since such circumstance is not favorable for designing the digital communication system, it is necessary to use the frame sync signal different from the conventional one in the wireless home link. Similarly, regarding the packet sync signal to be used in each packet in the frame not only to the frame sync signal, it is necessary to use the sync code series different from other digital communication systems. Thus, according to the present invention, it is necessary to construct a new sync code series that can be identified from the other digital communication systems by using the same correlation circuit as before.

On the other hand, the second problem is that the lengths of reference symbols are different. In the IEEE802.11a and BRAN, HISWAN, the length of one OFDM symbol is formed of 80 samples, i.e., 4 microsecond, and the length of reference symbol is formed of an integral multiple of it, that is, the length of reference symbol is formed of 320 samples.

However, as the length of OFDM symbol in the wireless home link, 72 samples per unit is proposed. And in this case, the reference symbol is desirable to have the integral multiple of 72 samples. For example, if it is used for 4 symbols, it becomes 288 samples (14.4 microsecond). If the conventional reference symbol is used as it is, it becomes 1.6 microsecond longer, and because not only the transmission efficiency would be decreased but also the processing cannot be conducted by dividing per one symbol, the construction of timing generation mechanism of the transmitter becomes complicated.

Accordingly, it is necessary to have the series with the length of reference symbol 14.4 microsecond. And it is desirable that this series can be detected in the same correlation circuit as the conventional circuit because of ease of forming LSI. Since these are the digital communication systems using the same 5 GHz band, it is expected to design the common machine that can be used in a plurality of systems.

In that case, if the structures of the correlation circuits differ according to the digital communication system to be used, the circuit size of LSI becomes large and the unit price of the LSI will not be decreased. And also if the common correlation circuit could be used, the same LSI can be used when making the single mode device not only the common machine. And thus, it is expected that the unit price of LSI can be lowered.

Accordingly, in the digital communication system, it is desired to have the new reference symbols having completely different structures that can be detected distinguishing them from each other and having the length of the integral multiple of 3.6 microsecond.

SUMMARY OF THE INVENTION

In view of the foregoing, an object of this invention is to provide a data modulation method and a data modulation device and a communication device capable of correctly detecting sync signal of the communication system in operation even when different communication systems exit mixed.

The foregoing object and other objects of the invention have been achieved by the provision a data modulation method and a data modulation device and a communication device. The transmission data is encoded to data symbol, and the reference symbol in which multiple sync patterns A and phase shifted sync pattern A, i.e., sync pattern IA, are aligned in time series in order to include the structure of "IA-A-IA-A-A-IA-A-IA-IA", are inserted into the data symbol and the data symbol in which the reference symbol is inserted will be modulated to the radio frequency signal.

Thus, the receiver side can obtain the correlation detection pattern different from the correlation detection pattern of all conventional sync code series because of the reference symbol.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are schematic diagrams showing the format of the conventional reference symbol;

FIG. 4 is a schematic diagram showing the construction of reference symbol of IEEE802.11a;

FIG. 5 is a schematic diagram showing waveforms of reference symbol of IEEE802.11a;

FIG. 6 is a schematic diagram showing the construction of reference symbol for BCH in the BRAN;

FIG. 8 is a schematic diagram showing the construction of reference symbol for UL in the BRAN;

FIG. 10 is a schematic diagram showing the construction of reference symbol for UL in the high speed wireless access system;

FIG. 15 is a schematic diagram illustrating the difference of correlation device output waveforms;

FIG. 20 is a schematic conceptual diagram showing the construction of reference symbol using the series B according to the present invention;

FIGS. 34A and 34B are schematic conceptual diagrams showing the construction of reference symbol using the series A according to the other embodiment; and FIGS. 35A and 35B are schematic conceptual diagrams showing the construction of reference symbol using the series B according to the other embodiment.

DETAILED DESCRIPTION OF THE EMBODIMENT

Preferred embodiments of this invention will be described with reference to the accompanying drawings:

(1) Theorem

The same repetition units as the conventional ones, series A and series B, will be used. By using the specific repetition pattern in the repetition pattern of the series A, the correlation detection pattern different from all conventional reference symbols can be obtained. Thus, in the case of differentiating the digital communication system by the receiver, distinction becomes possible at once when detecting the reference symbol without demodulating the signal by the OFDM system.

More specifically, new code repetition patterns using the conventional series A and series B are as follows: "IA-A-IA-A-A-IA-A-IA-IA-C16-C64-C64" (reference symbol used the series A), and "IB-IB-IB-IB-B-B-B-B-IB-C16-C64-C64" (reference symbol used the series B).

The combination of these 2 types obtains the correlation output characteristics different from the conventional pattern. In the following explanations "IA-A-IA-A-A-IA-A-IA-IA-C16-C64-C64" will be referred to as the series (1) and "IB-IB-IB-IB-B-B-B-B-IB-C16-C64-C64" will be referred to as the series (2). These are formed of 14.4 microsecond and (for 4 symbols) of OFDM symbol of 72 samples.

As the feature of these series (1) and series (2), in the series (1), only series A is used as the repetition units and the series B is not used. Contrary to this, in the series (2), only series Bs are used. In this connection, IA means the signal waveform of the phase-shifted sync pattern A. Moreover, IB means the signal waveform of the phase-shifted sync pattern B.

Furthermore, the series C makes the LSI operable by using the same waveform as the other system.

(2) Signal Analysis of Reference Symbol

Figure 17:
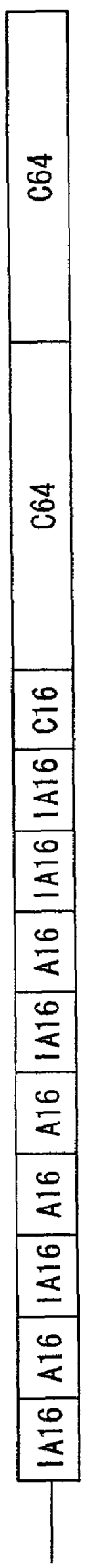
FIG. 17 is a schematic conceptual diagram showing the construction of reference symbol using the series A according to the present invention.
Figure 18:
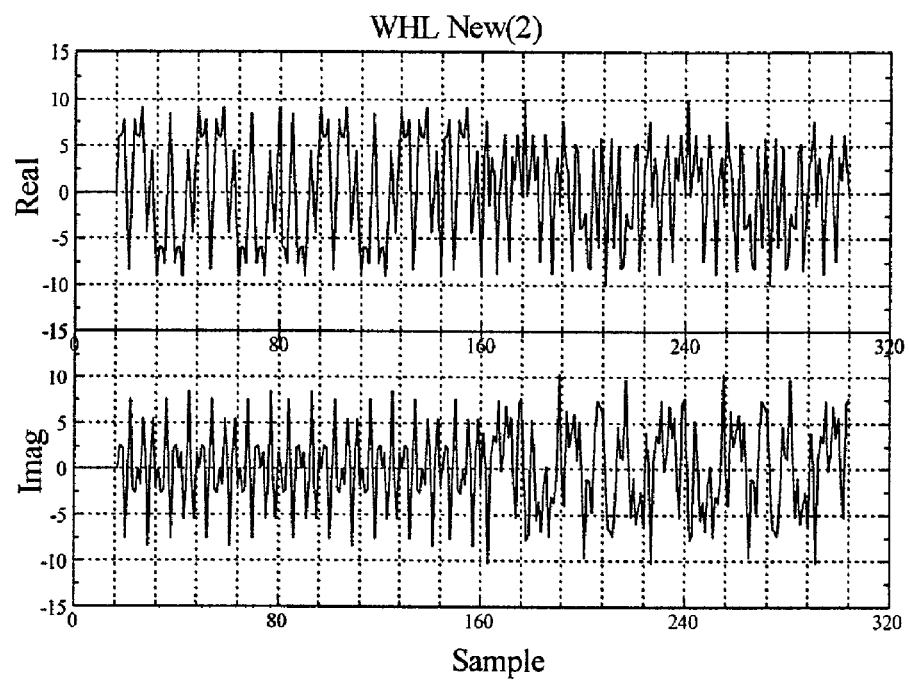
FIG. 18 is a schematic diagram showing waveforms of the reference symbol of the series (1)

Firstly, the signal analysis result of the reference symbol of the series (1) will be explained. The input pattern of the series (1) into the IFFT is the same as shown in EQUATION (4), and its output waveform consists of 64 samples as shown in FIGS. 17 and 18. And its waveform has the waveform formed of A-IA-A-IA, and A signal consisting of 16 samples and the following shifted A, i.e., IA, appear alternately. The reference symbol of the series (1) is formed of these signals combined.

Figure 19:
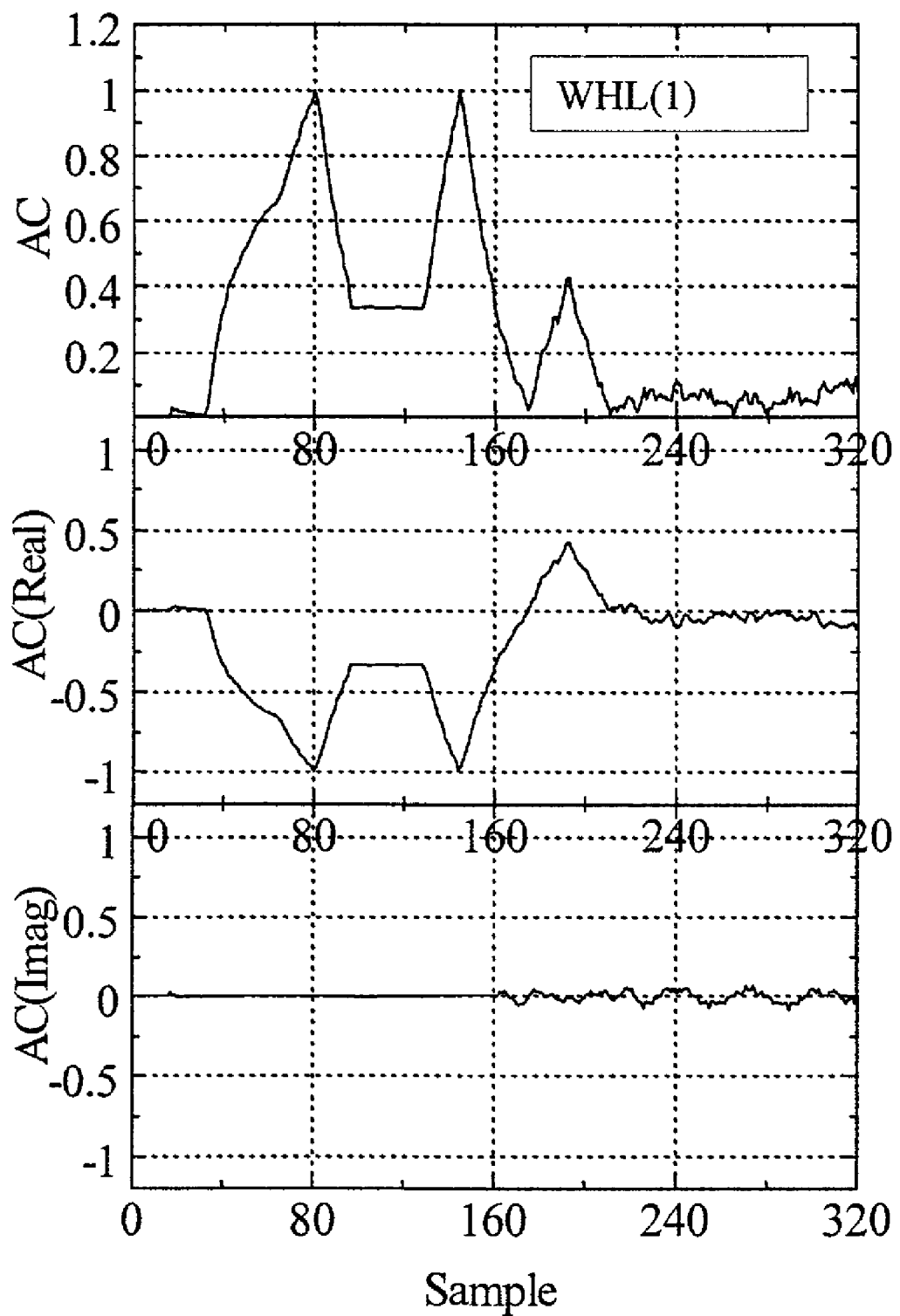
FIG. 19 is a schematic diagram showing waveforms of the correlation device output with respect to the reference symbol of the series (1)

Moreover, as shown in FIG. 19, 2 peak waveforms appear in the output waveform of the correlation circuit. As is clear from the waveform of the middle stage, codes of the real part of the correlation circuit are minus at these 2 peaks and 0 on the imaginary part. That is, the phase is constantly 180° and this does not change. Accordingly, this can be clearly distinguished from the sync signal of the other system.

Figure 21:
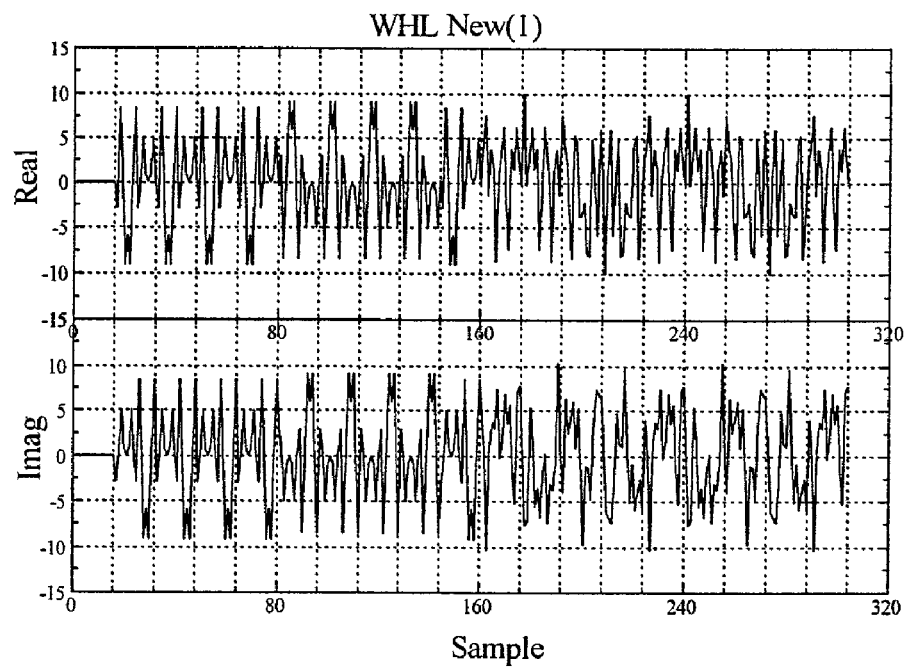
FIG. 21 is a schematic diagram showing waveforms of the reference symbol of the series (2)

Next, the signal analysis result of the reference symbol of the series (2) will be explained. The input pattern of the series (2) into the IFFT is as shown in EQUATION (5), and as shown in FIGS. 20 and 21, its output waveform consists of 64 samples. And its waveform has the waveform formed of B-B-B-B, and B signal consisting of 16 samples will appear repeatedly. The reference symbol of the series (2) is formed of these signals combined.

Figure 22:
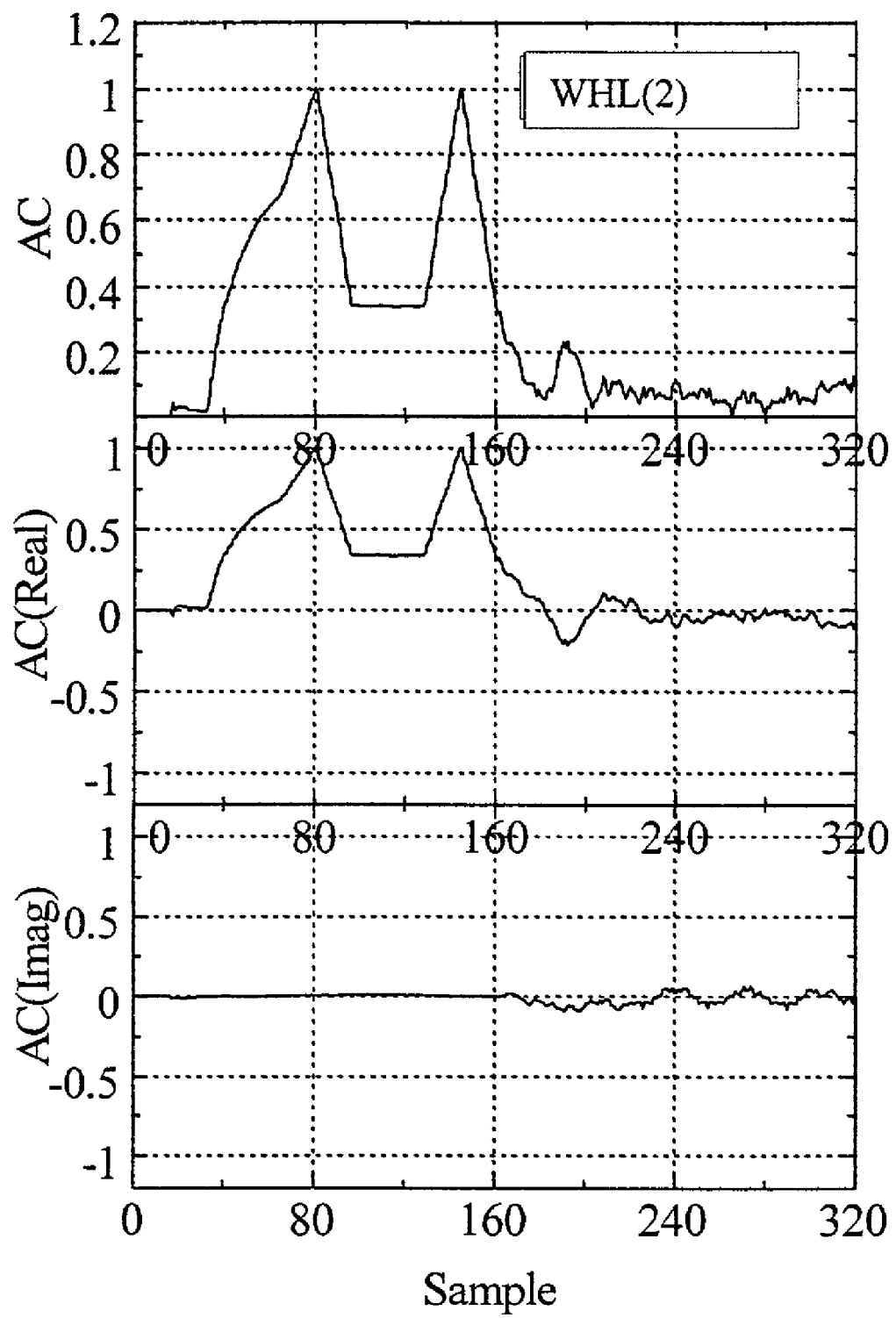
FIG. 22 is a schematic diagram showing waveforms of the correlator output with respect to the reference symbol of the series (2)

Furthermore, as shown in FIG. 22, 2 peak waveforms appear in the output waveform of the correlation circuit. As is clear from the waveform of the middle stage, codes of the real part of the correlation circuit are plus at 2 peaks, and the imaginary part is 0. That is, the phase is always 0 and constant and it does not change. Accordingly, this can be clearly distinguished from the sync signal of the other system.

Figure 25:
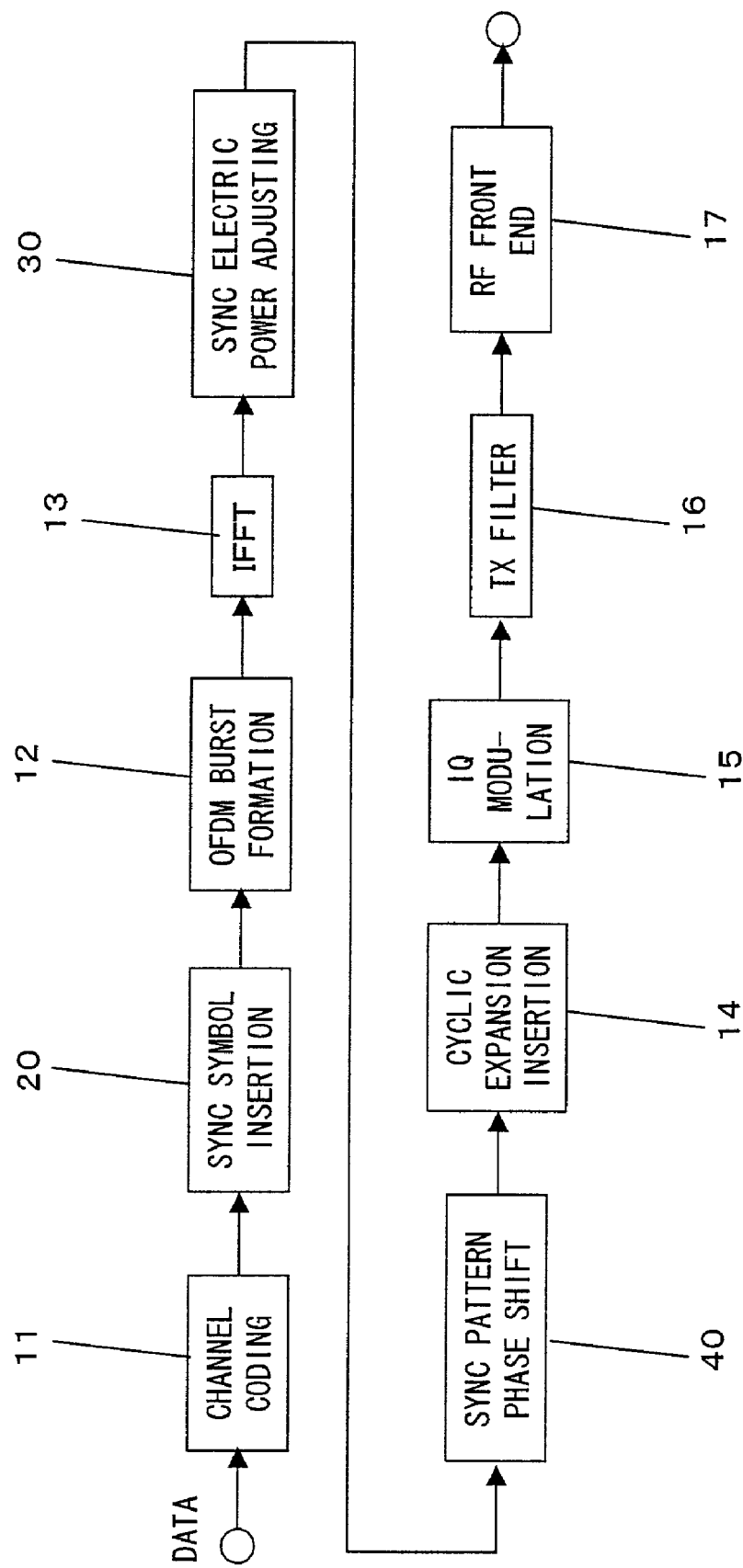
FIG. 25 is a block diagram showing the circuit construction of a transmitter.

Thus, as is apparent from FIG. 25, the series (1) and the series (2) can be distinguished.

Figure 1:
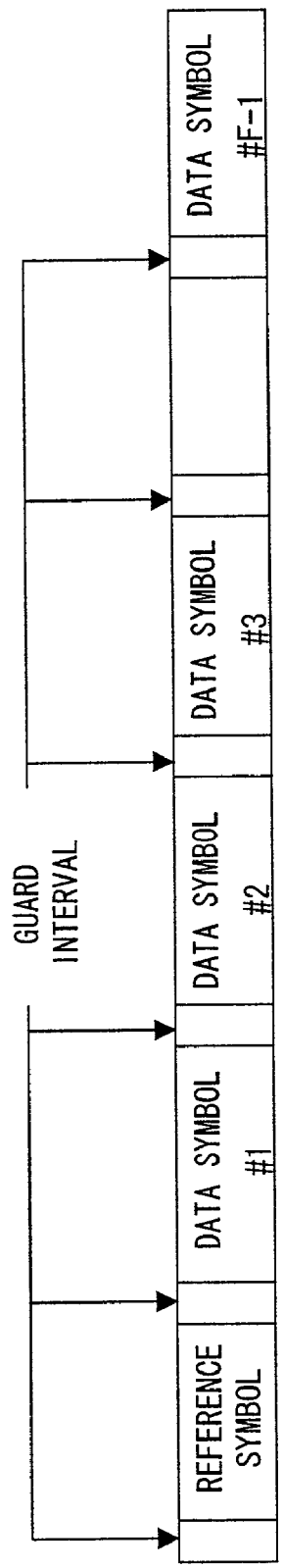
FIG. 1 is a schematic diagram showing the format of burst frame.
Figure 3:
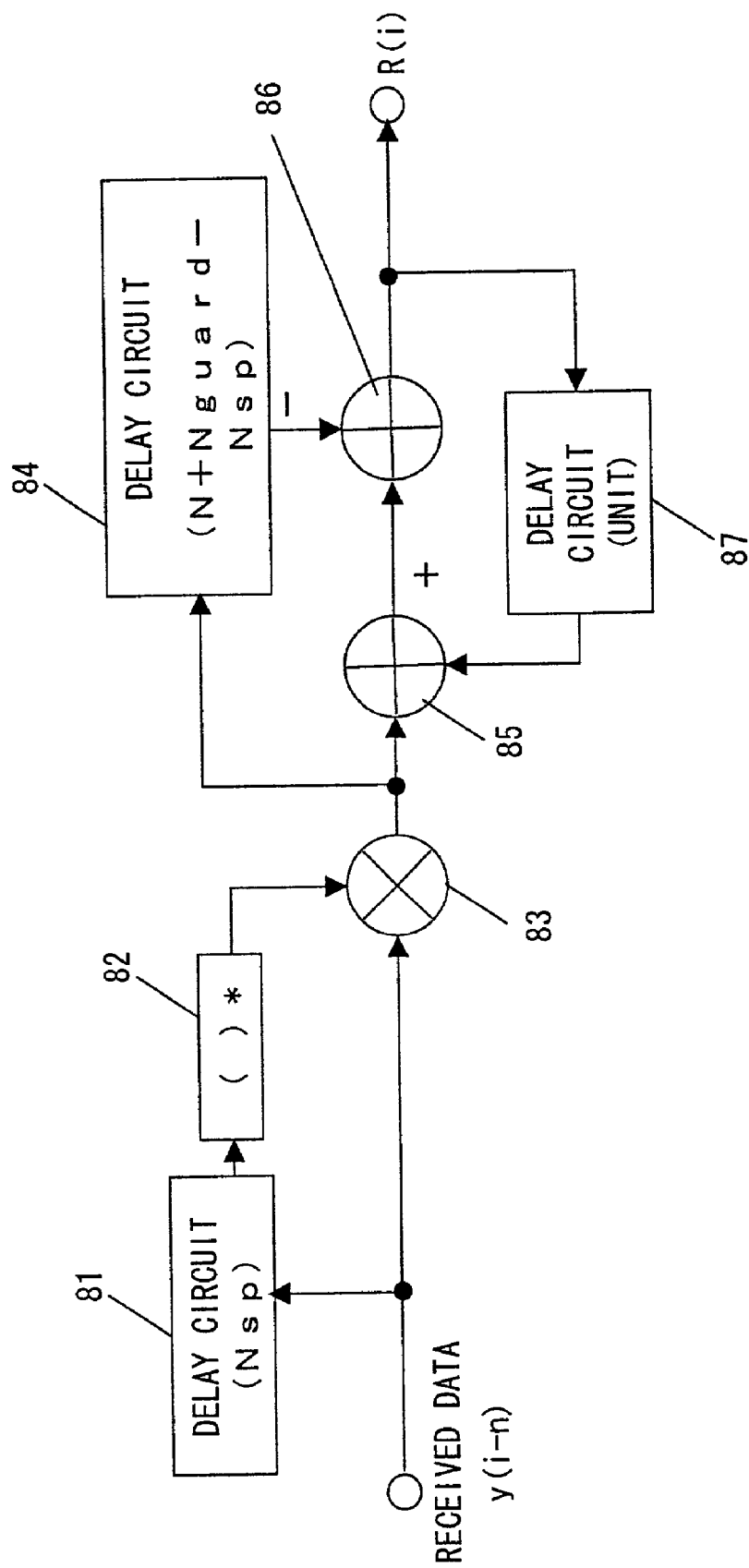
FIG. 3 is a block diagram showing the construction of a circuit for calculating the correlation value.
Figure 5:
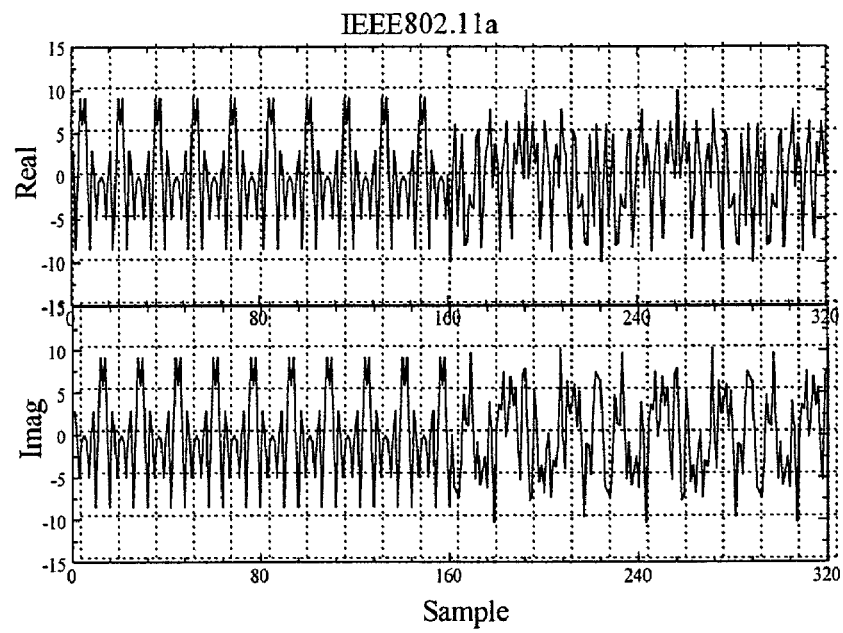
Figure 7:
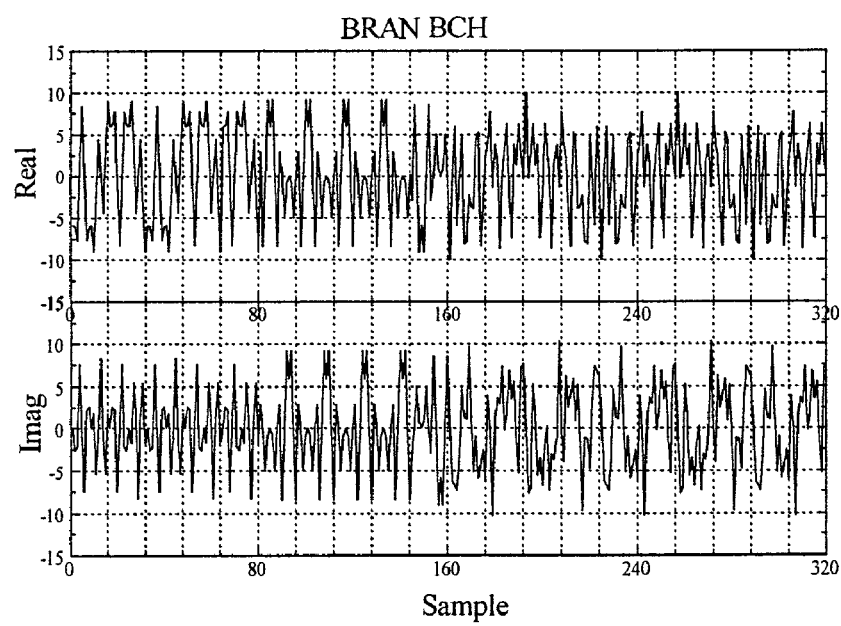
FIG. 7 is a schematic diagram showing waveforms of reference symbol for BCH in the BRAN.
Figure 9:
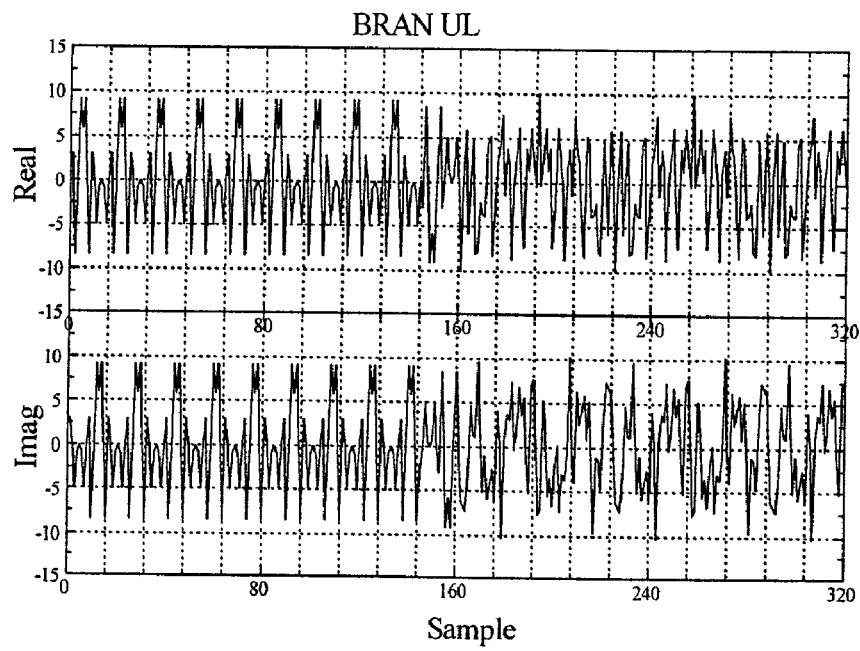
FIG. 9 is a schematic diagram showing waveforms of reference symbol for UL in the BRAN.
Figure 11:
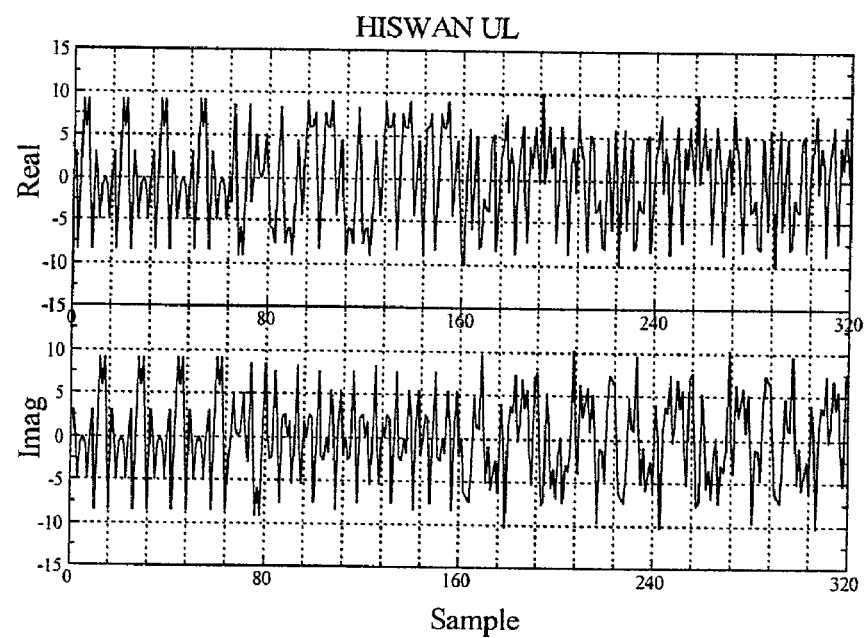
FIG. 11 is a schematic diagram showing waveforms of reference symbol for UL in the high speed wireless access system.
Figure 24B:
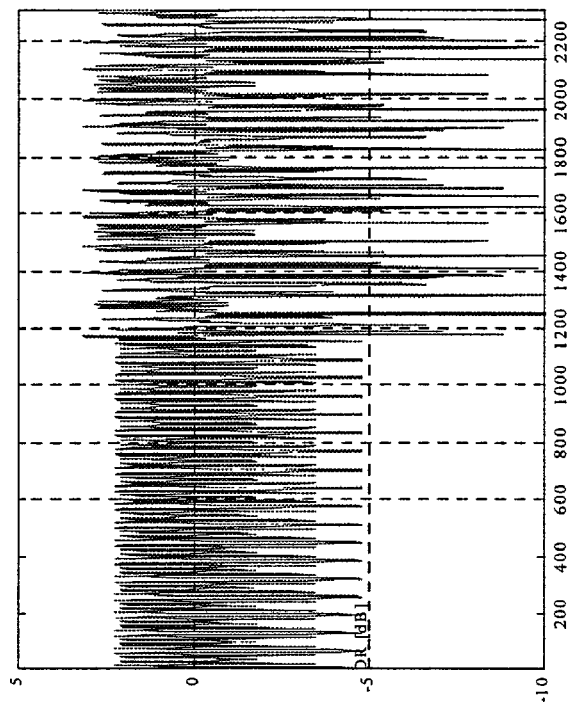
FIGS. 24A and 24B are schematic diagrams illustrating the electric power waveforms of the reference symbol.
Figure 24A:
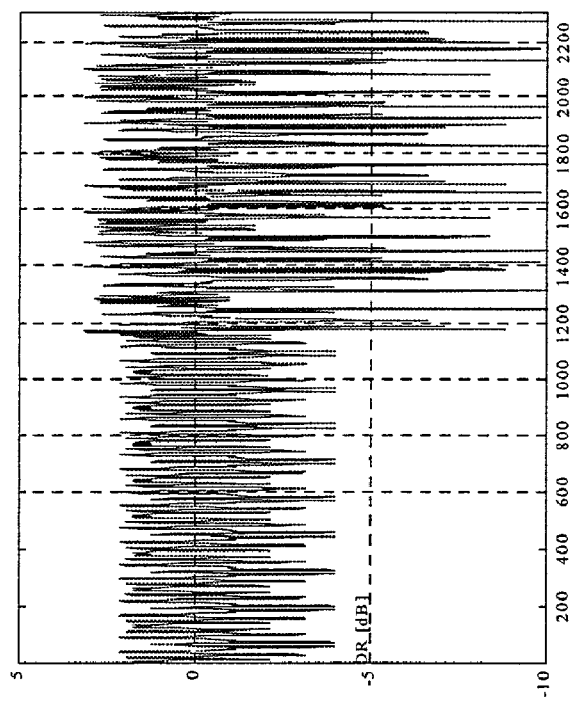

FIGS. 24A and 24B show waveforms of the reference symbol signal. FIG. 24A is the momentary electric power waveform of the series A, and FIG. 24B is the momentary electric power waveform of the series B. The transversal axis shows the sample number 8 times over sampled, and the vertical axis shows the electric power normalized by the average electric power by dB. The maximum value of the vertical axis shows the peak average ratio. The first half part is approximately 2 dB, and the latter half part corresponding to the series C is approximately 3 dB. Since the first half part of the signal will be used for inputting the automatic gain control (AGC), the peak average peak ratio (PAPR) is kept in sufficiently low value. The dynamic range of the first half part is approximately 5 dB in FIG. 24A and 7 dB in FIG. 24B.

(3) Construction of Transmitter

Next, a transmitter to which these techniques are applied will be described referring to drawings. FIG. 25 is a block diagram showing the detailed construction of a transmitter capable of correctly supplementing the timing according to the present invention.

As shown in FIG. 25, this transmitter is equipped with a channel encoder 11, and data to be transmitted (hereinafter referred to as transmission data) will be supplied to the channel encoder 11, and outputs of this channel encoder 11 will be supplied to a sync symbol insertion circuit 20.

Figures 23, 26:
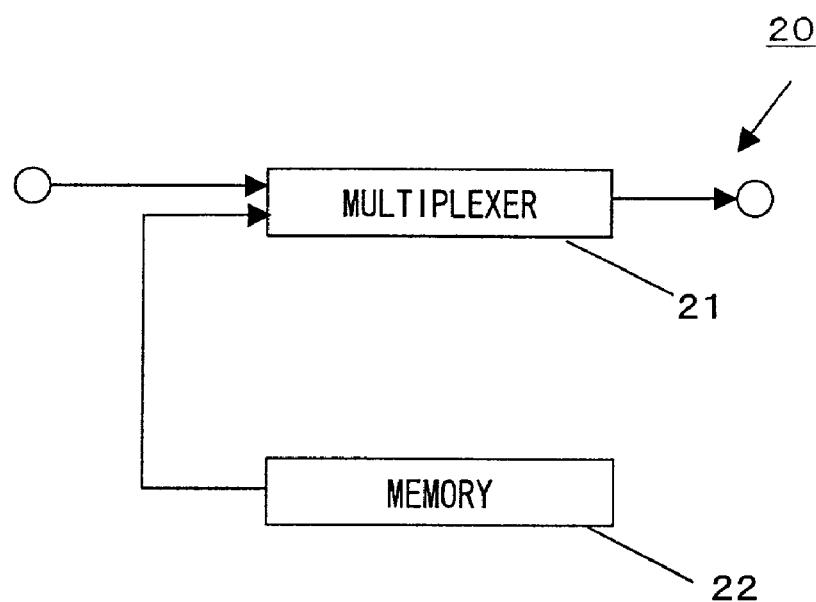
FIG. 23 is a schematic diagram showing the difference of correlation output waveforms.
FIG. 26 is a block diagram showing the construction of a sync symbol insertion circuit.

As shown in FIG. 26, the sync symbol insertion circuit 20 is equipped with a multiplexer 21 and a memory 11. The multiplexer 21 inserting the reference symbol read out from the memory 22 into the encoded transmission data to be given from the channel encoder 11, supplies this to the orthogonal frequency division multiplexing (OFDM) burst forming circuit 12.

The OFDM burst forming circuit 12 forms the burst frames in the OFDM system from the transmission data in which the reference symbol is inserted and supplies this to the inverse fast Fourier transform (IFFT) circuit 13. The IFFT circuit 13 conducts the inverse fast Fourier transform to the transmission data burst-framed and supplies this to the sync electric power adjusting circuit 30.

The sync electric power adjusting circuit 30 increases the transmission power when sending the reference symbol as will be described later. Then, the output of the sync electric power adjusting circuit 30 will be supplied to the sync pattern phase-shift circuit 40.

Figure 27:
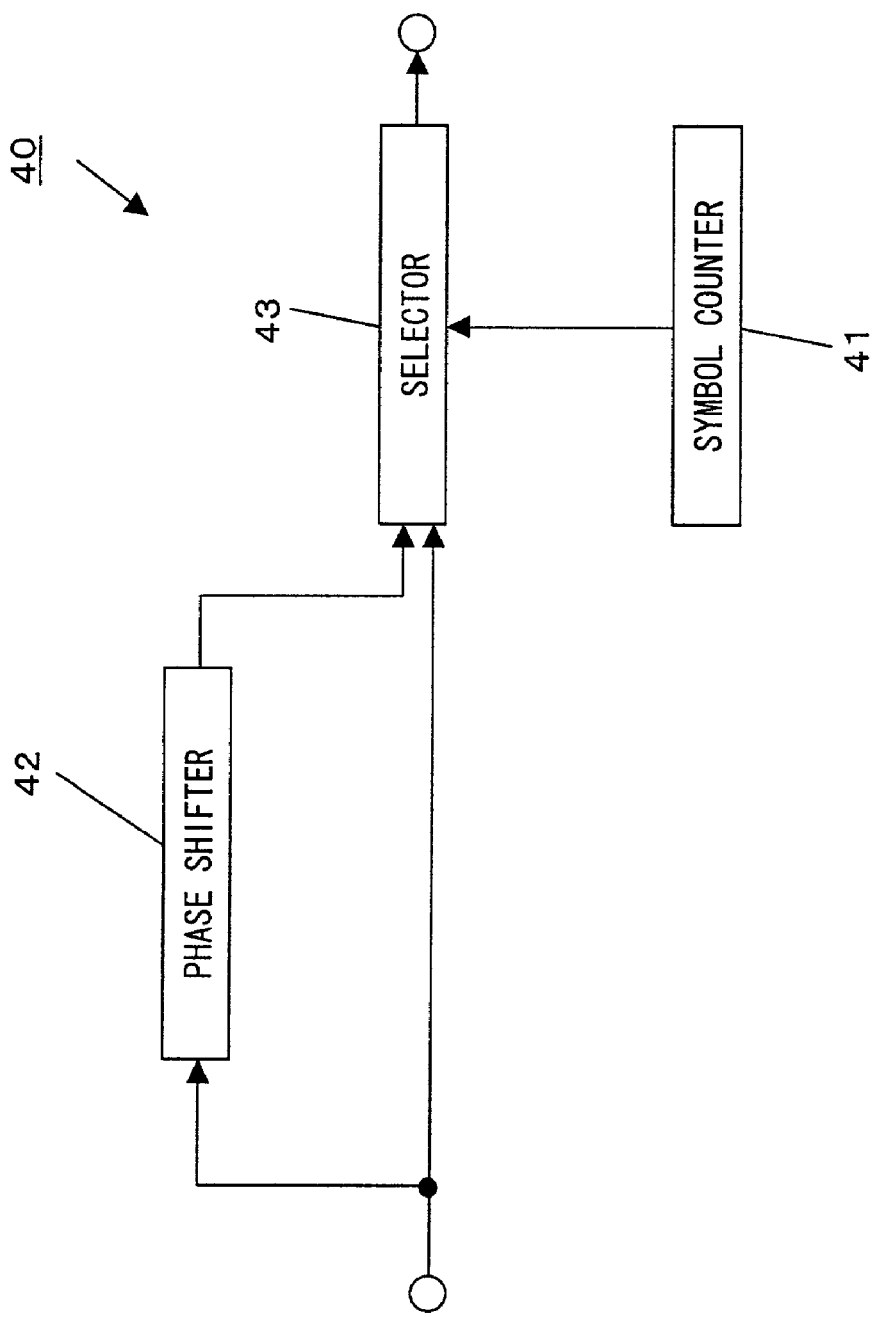
FIG. 27 is a block diagram showing the construction of a sync pattern phase-shift circuit.

As shown in FIG. 27, the sync pattern phase-shift circuit 40 is equipped with a symbol counter 41, a phase-shifter 42, and a selector circuit 43. The symbol counter 41 detects the position of the predetermined sync pattern of the reference symbol and supplies this to the selector circuit 43.

The phase shifter 42, shifting the phase of the predetermined sync pattern, supplies to the selector circuit 43. The selector circuit 43, switching the sync pattern in which the phase of reference symbol is shifted to the other sync pattern of the same reference symbol, supplies this to the cyclic expansion insertion circuit 14.

The cyclic expansion insertion circuit 14, inserting the reference symbol to the transmission data, supplies this to the in-phase/quadrature-phase (IQ) modulator 15. The IQ modulator 15, after converting the complex transmission data in which reference symbol is inserted to the real number transmission data (I series data and Q series data), quadrature-phase modulating the carrier wave using these data, forms a radio frequency (hereinafter referred to as RF) signal and supplies this to the TX (transmission) filter 16.

The TX filter 16, after filtering the RF signal in order to control the band, supplies this to the RF front end 17. Then, the RF front end 17 transmits the RF signal.

Thus, in this transmitter, the reference symbol is inserted in the frequency domain in order to avoid more complicated processings required in the case of inserting the reference symbol in time domain.

In this connection, the average electric power of the reference symbol is lower than the data symbol modulated by the OFDM system because the number of sub-carriers modulated is small.

Accordingly, the sync electric power adjusting circuit 30 increases the transmitting electric power to conform to the average electric power of data symbol modulated by the OFDM system.

Figure 28:
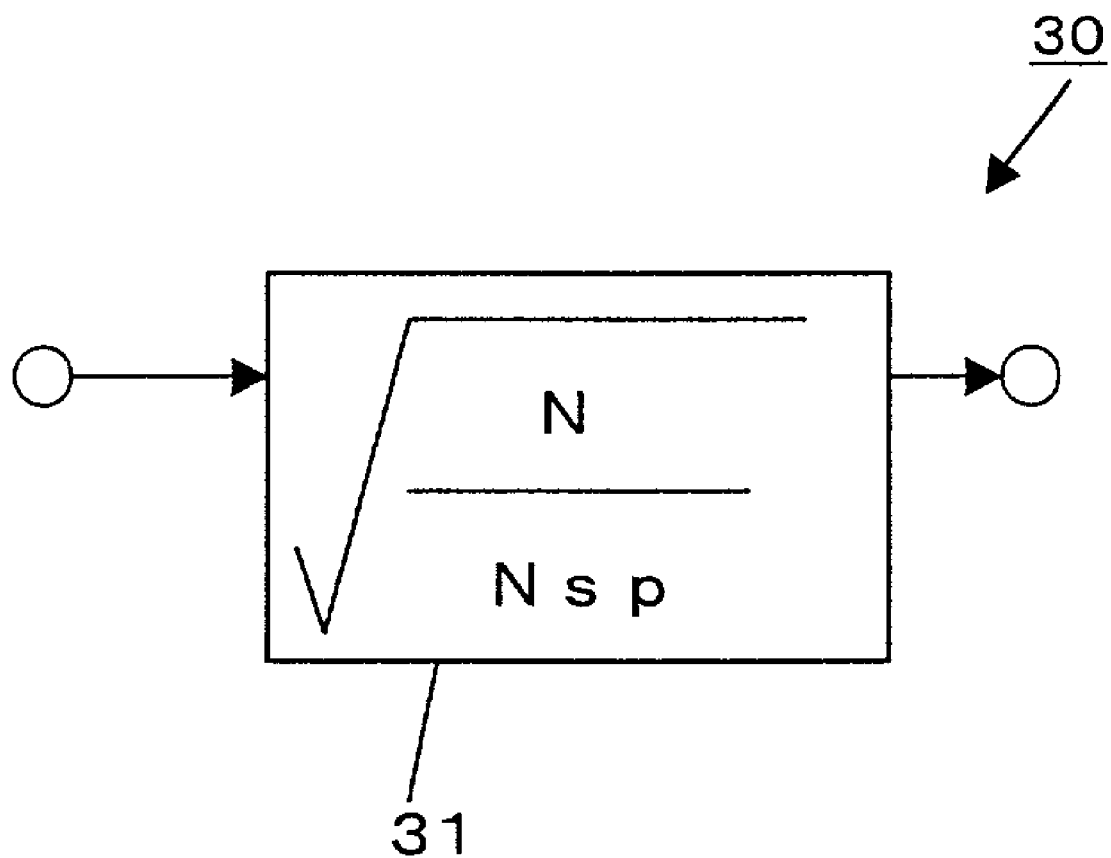
FIG. 28 is a block diagram showing the construction of a multiplier.

More specifically, the sync electric power adjusting circuit 30 is equipped with a multiplier 31 as shown in FIG. 28.

$$F_{pow} = \sqrt{\frac{N}{N_{sp}}} \tag{7}$$

The sync electric power adjusting circuit 31 multiplies each sample of the reference symbol by the electric power adjusting coefficient Flow shown as above in EQUATION (7).

Then, after the electric power has been adjusted, the phase of the predetermined sync pattern will be rotated for the fixed amount. The amount of phase rotation is such as 180° rotation, and −1 is multiplied.

(4) Construction of Receiver

Figure 29:
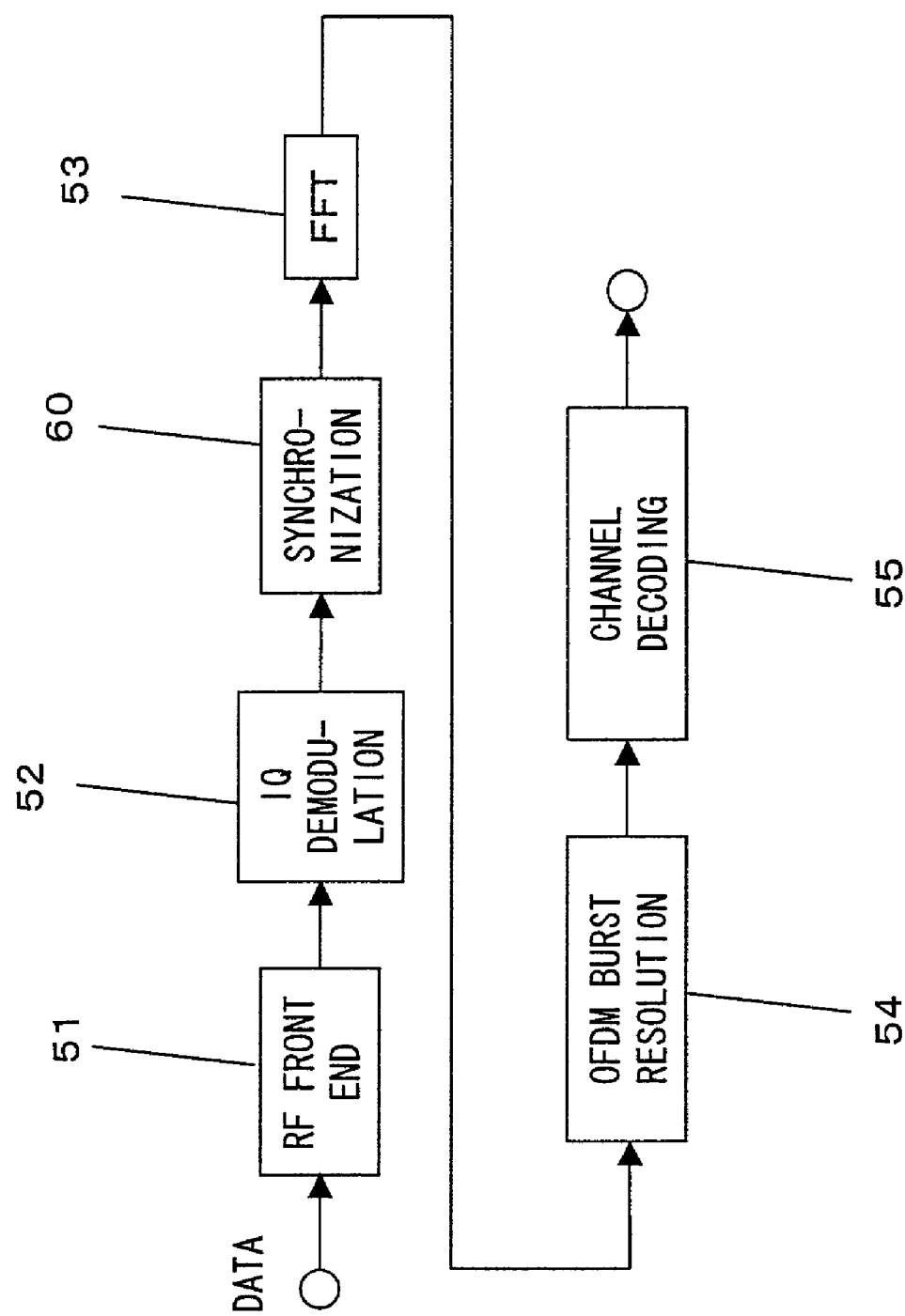
FIG. 29 is a block diagram showing the circuit construction of a receiver.

Next, a receiver according to the present invention will be described. FIG. 29 is a block diagram showing the detailed construction of a receiver according to the present invention.

This receiver comprises a RF front end 51, and the RF signal received at the RF front end 51 is supplied to the IQ demodulator 52. The IQ demodulator 52 demodulates the RF signal and supplies the resulting complex data received to the synchronizing circuit 60.

Figure 30:
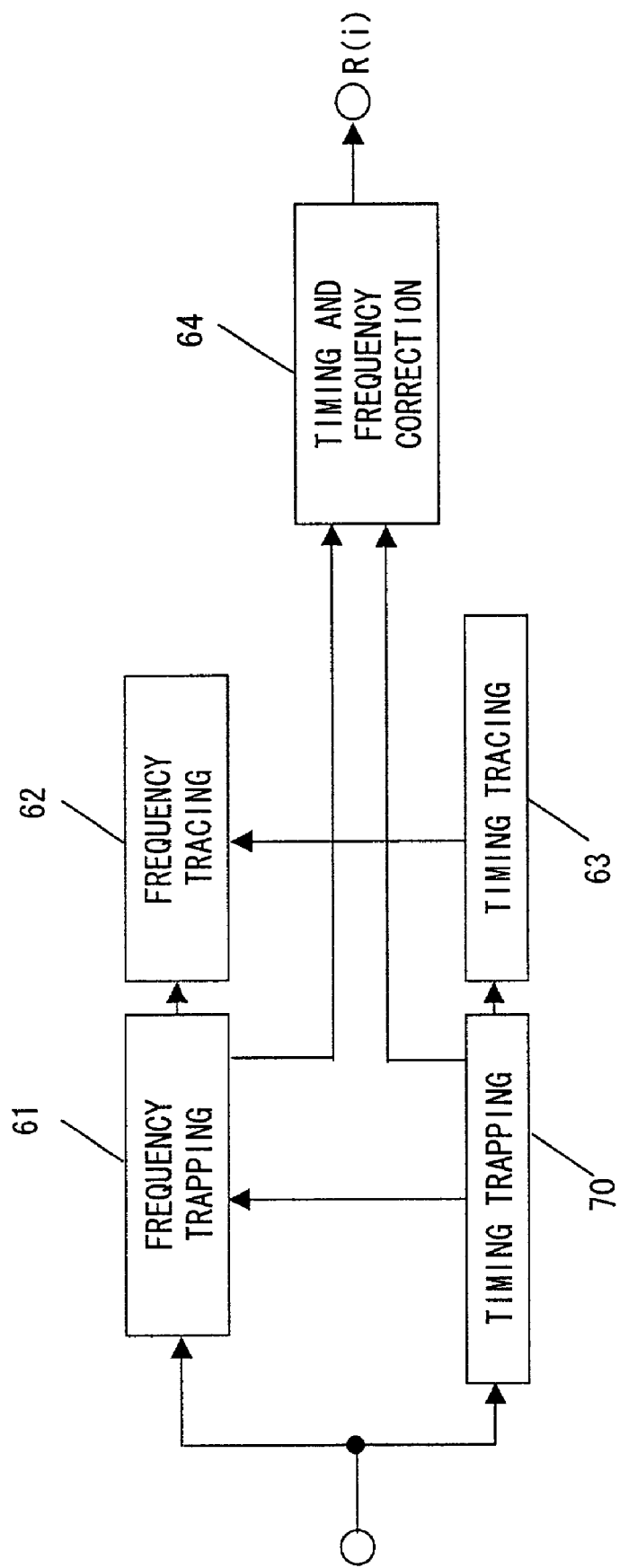
FIG. 30 is a block diagram showing the construction of a synchronizing circuit.

As shown in FIG. 30, the synchronizing circuit 60 comprises a frequency supplement circuit 61, frequency tracing circuit 62, timing supplement circuit 70, timing tracing circuit 63 and the timing and frequency correction circuit 64.

Figure 31:
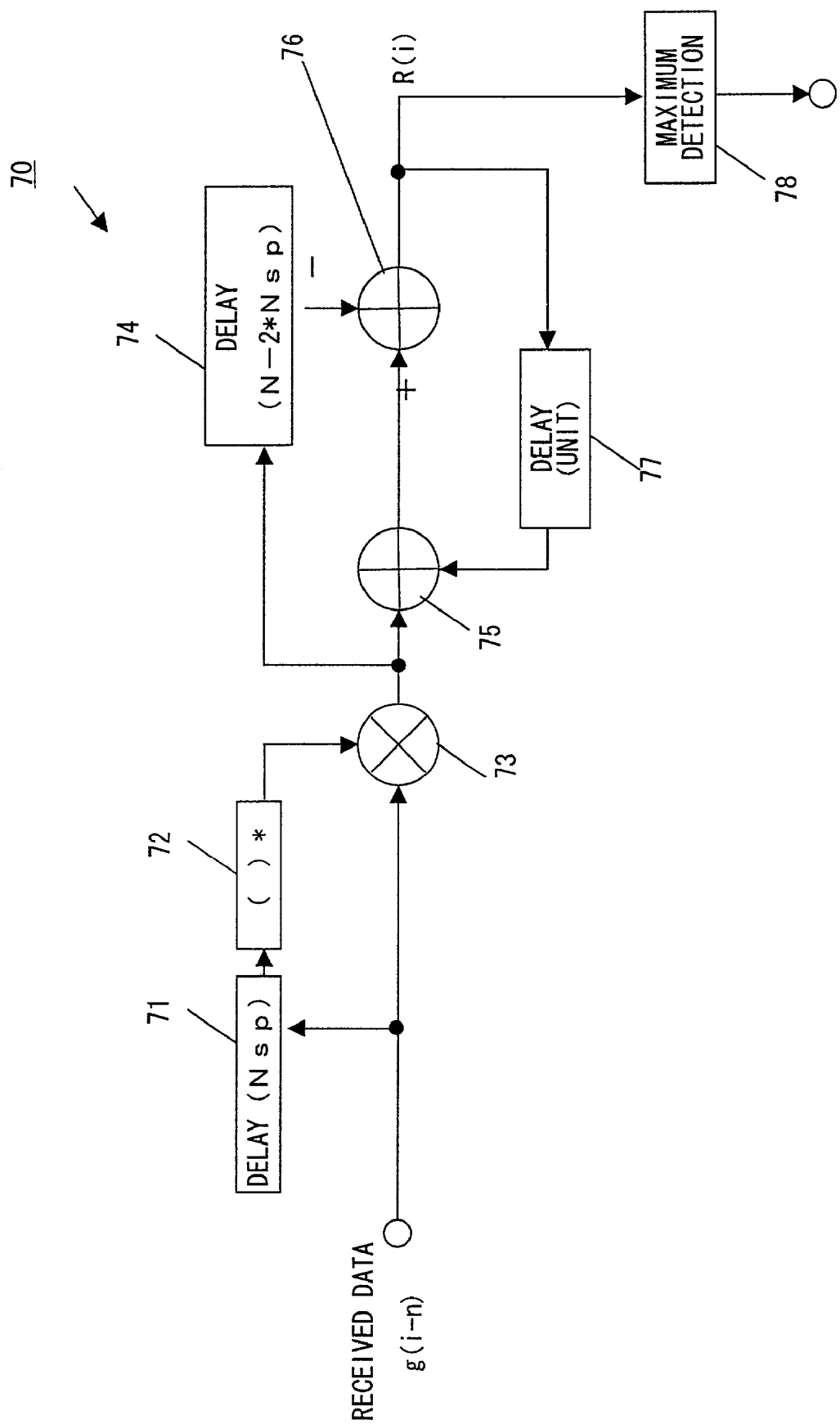
FIG. 31 is a block diagram showing the construction of a timing supplement circuit.

Moreover, as shown in FIG. 31, the timing supplement circuit 70 is equipped with a delay circuit 71, a conjugate complex function device 72, a multiplier 73, a delay circuit 74, an adder 75, a subtracter 76, a delay circuit 77 and a maximum detection circuit 78.

The delay circuit 71 delays the complex receive data from the IQ demodulator 52 for Nsp, i.e., for 1 sync pattern, and supplies to the conjugate complex function device 72. The conjugate complex function device 72 supplies this to the multiplier 73 searching for the conjugate complex data of the complex receive data. And the multiplier 73 multiplies the complex receive data by the conjugate complex data, i.e., conducts the calculation of EQUATION (3) described above, and supplies the resulting multiplied data, i.e., the correlation value R(i) to the delay circuit 74 and the adder 75.

The delay circuit 74 delays the multiplied data for the period shown in the following EQUATION (8) and supplies this to the subtracter 76.

$$(N-2*N_{sp}) \quad (8)$$

The output data of the adder 75 is supplied to this subtracter 76. And the subtracter 76 subtracts the multiplied data delayed at the delay circuit 74 from the output data, and supplies the resulting subtracted data to the delay circuit 77 having the delay time of 1 unit and the maximum detection circuit 78.

The adder 75 adding up the multiplied data from the multiplier 73 and the subtracted data delayed at the delay circuit 77, supplies this to the subtracter 76 as described above. The maximum detection circuit 78 obtains the sample position at which the output of the subtracter 76 becomes the maximum and supplies this to the timing tracing circuit 63.

With this arrangement, the synchronization is trapped. The timing tracing circuit 63 monitors so that this trapped synchronism would not be released.

Outputs of the synchronization circuit 60, such as the frame timing signal showing the burst frame section and the packet synchronizing signal showing the symbol timing are supplied to the fast Fourier transform (FFT) circuit 53. And the FFT circuit 53 conducts the fast Fourier transforms to the received data according to the timing signal of the synchronizing circuit 60 and supplies this to the OFDM burst resolving circuit 54.

The OFDM burst resolving circuit 54 removes the burst frame and makes the data to bit stream and outputs this via the channel decoder 55.

More specifically, the synchronizing circuit 60, as well as calculating the timing and the offset of frequency to be brought in the received data, corrects errors. The timing and frequency trapping algorithm is used for the initial synchronization at the beginning of the burst frame. On the other hand, the timing and the frequency tracing algorithm will be used for maintaining the timing and frequency during the period from the time when the timing and frequency are trapped to the time these are renewed.

As described above, by changing the structure of reference symbol according to the present invention, the timing trapping accuracy can be remarkably increased. The maximum detection circuit 78 detects the maximum value of the correlation value R(i) of the reference symbol having renewed structure. And if the timing trapping would be conducted correctly, the frequency trapping can be conducted correctly.

According to the embodiment described above, the sync code series having the timing and frequency trapping functions, and selecting only the digital communication system to which it belongs and reacting to this not synchronizing with the different digital communication system by selecting different sync code series has been shown.

(5) Construction of Digital Communication System

Figure 32:
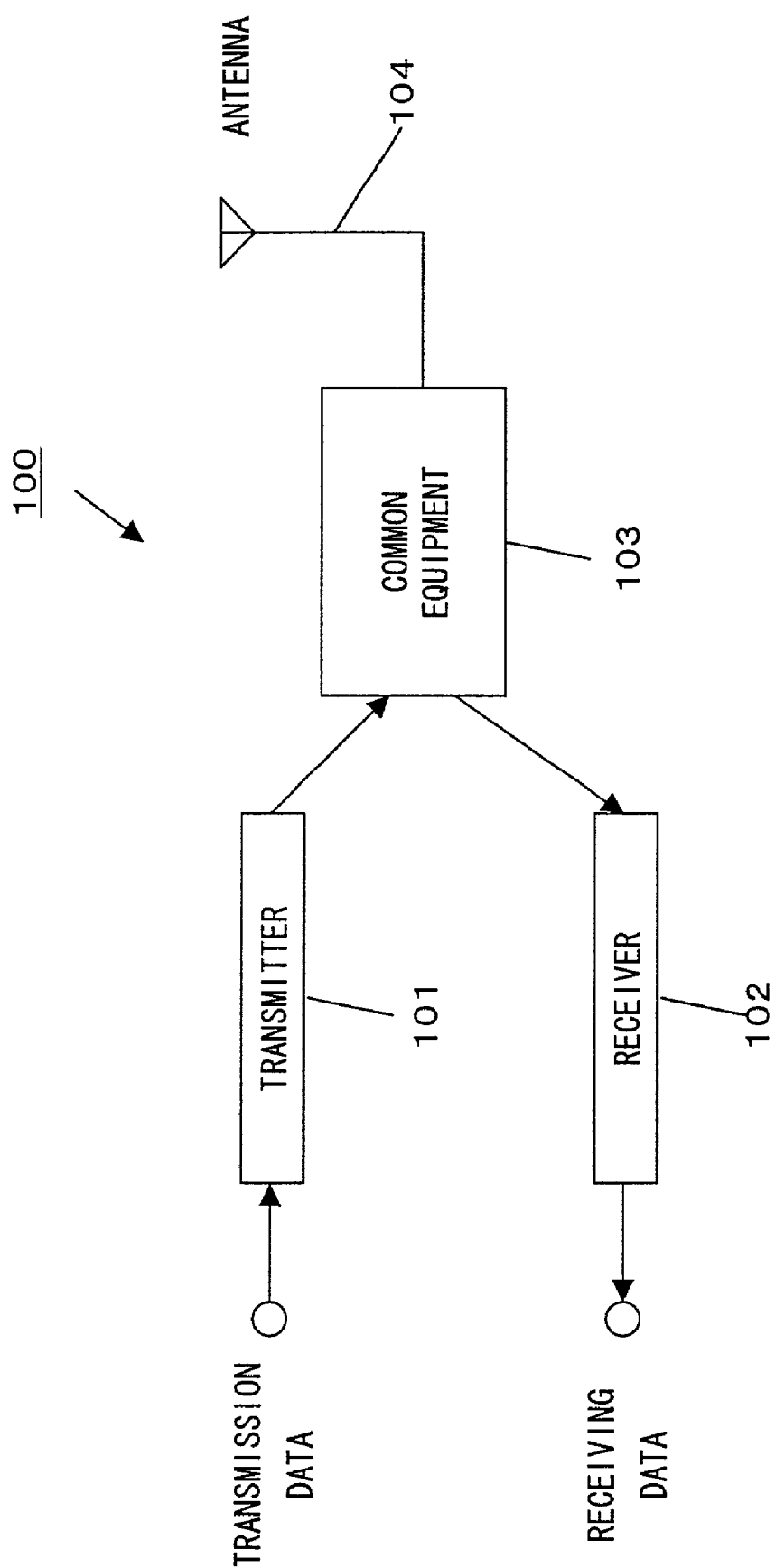
FIG. 32 is a block diagram showing the circuit construction of receiver/transmitter.

FIG. 32 is a block diagram showing the general construction of transmitter/receiver to be used in the digital communication system. Here, the OFDM wireless communication system will be used as an example of the digital communication system. The transmitter 101 is equipped with the functions described above in FIG. 25. The receiver 102 is equipped with the function described above in FIG. 29. The transmission signal and received signal are connected to an antenna 104 via an antenna for common use 103. The effects of the present invention in the OFDM wireless communication system in which the plural number of the OFDM transmitters/receivers are formed in network form will be described in the following chapters.

Figure 33:
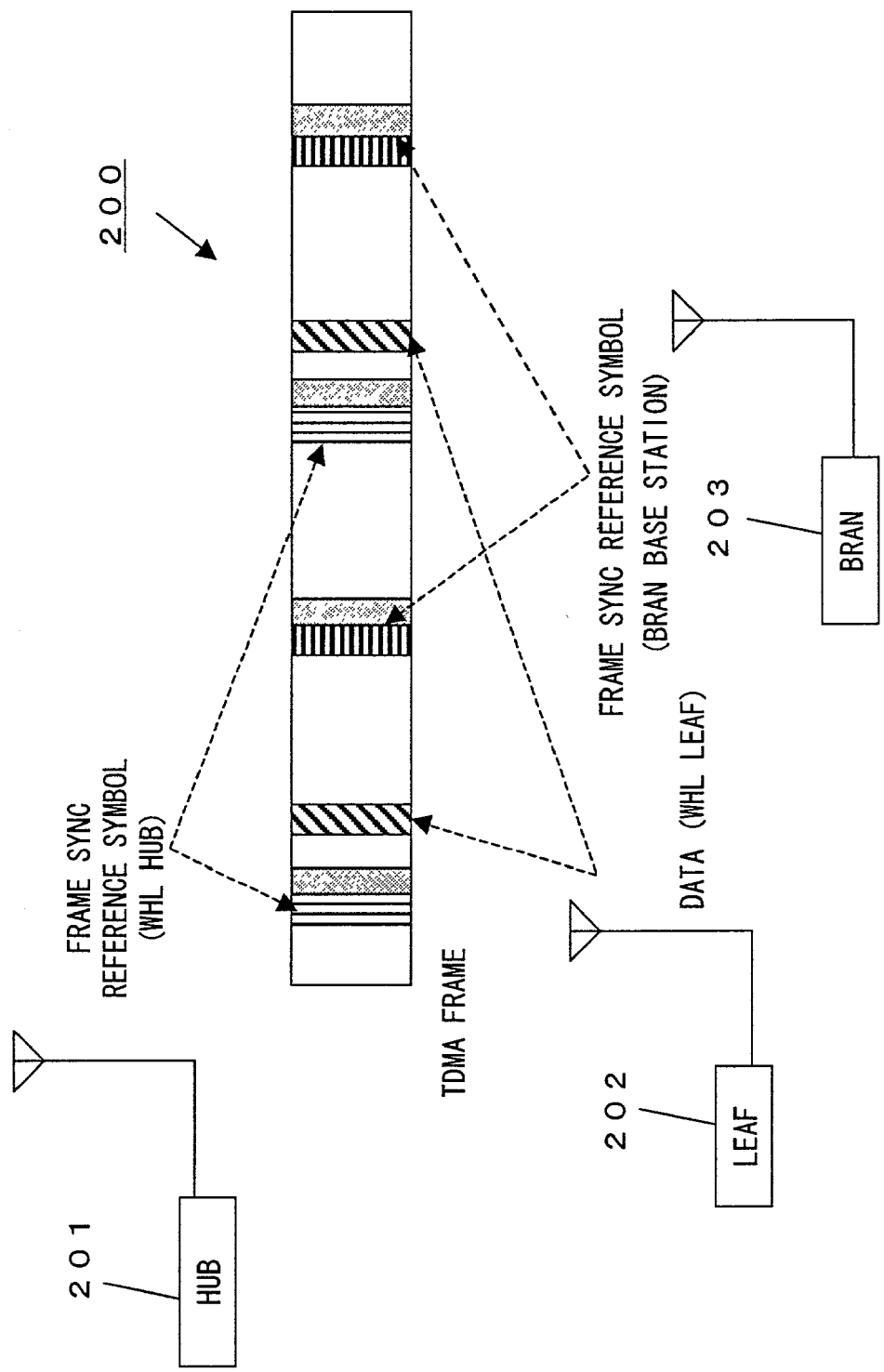
FIG. 33 is a block diagram illustrating the network configuration of the wireless home link.

FIG. 33 is a diagram showing the network in which the wireless home-link and the digital communication system of BRAN are coexisted. In this connection, suppose that the waveform of the series (1) would be used as the frame sync code series, and the waveform of the series (2) would be used as the packet sync code series.

One hub station 201 continuously transmits the reference symbol for frame synchronization at the cycle of 4 mm seconds and defines the frame boundaries of wireless home links. The hub station works as the network control station. The wireless transmitters/receivers other than the hub station are called as leaf stations, and firstly these leaf stations detect the frame synchronizing signal from the hub station and find the control station to which they themselves enter.

Suppose that the other system such as the BRAN system base station 203 exists within the range this leaf station 202 can receive signal and is continuously transmitting the reference symbol for frame synchronization described above in FIG. 6.

In this case, for the leaf station of the wireless home link 202, the control station to which it should enter is the hub station 201 and the base station of the BRAN system is not the control station to which it enters. Thus, the leaf station identifies the reference symbol for frame synchronization of the hub station by using the correlation circuit that it owns.

Figure 12:
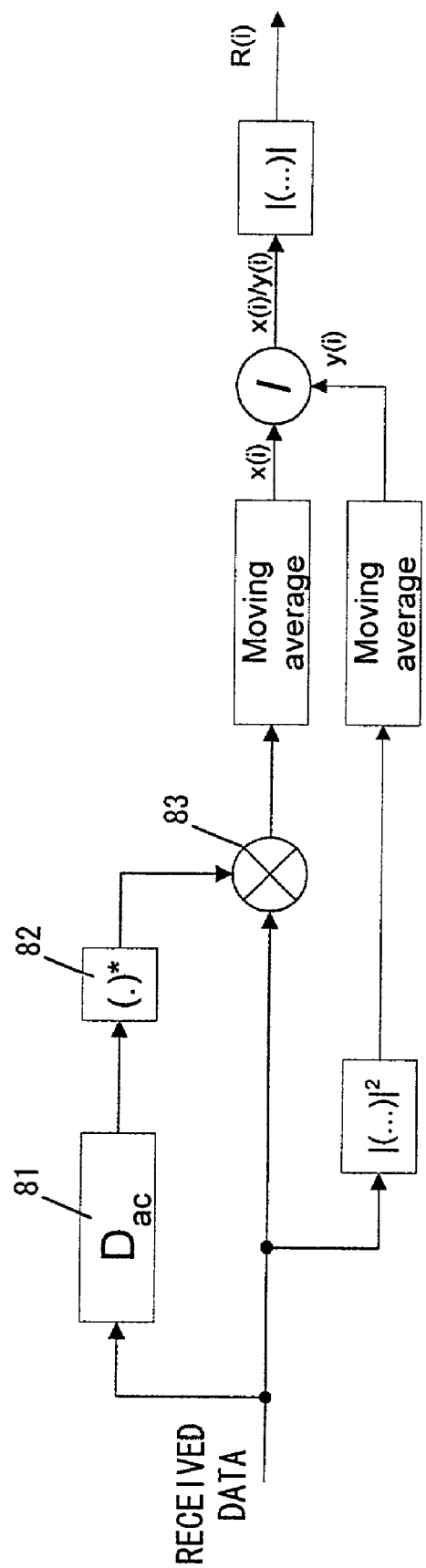
FIG. 12 is a block diagram showing the construction of a correlation device.
Figures 13A, 13B:
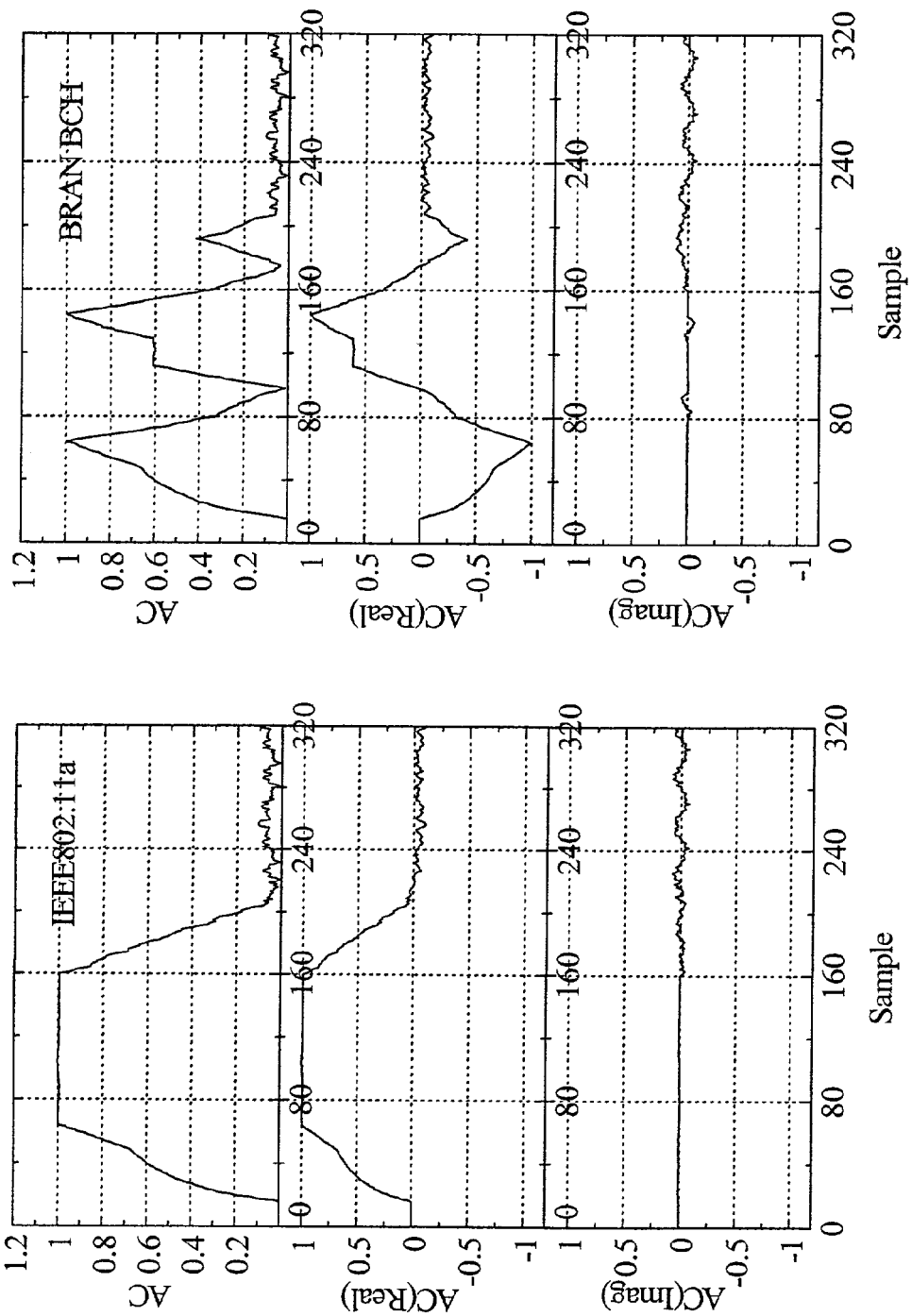
FIGS. 13A and 13B are schematic diagrams showing waveforms of the correlation device output with respect to each reference symbol.
Figure 14B:
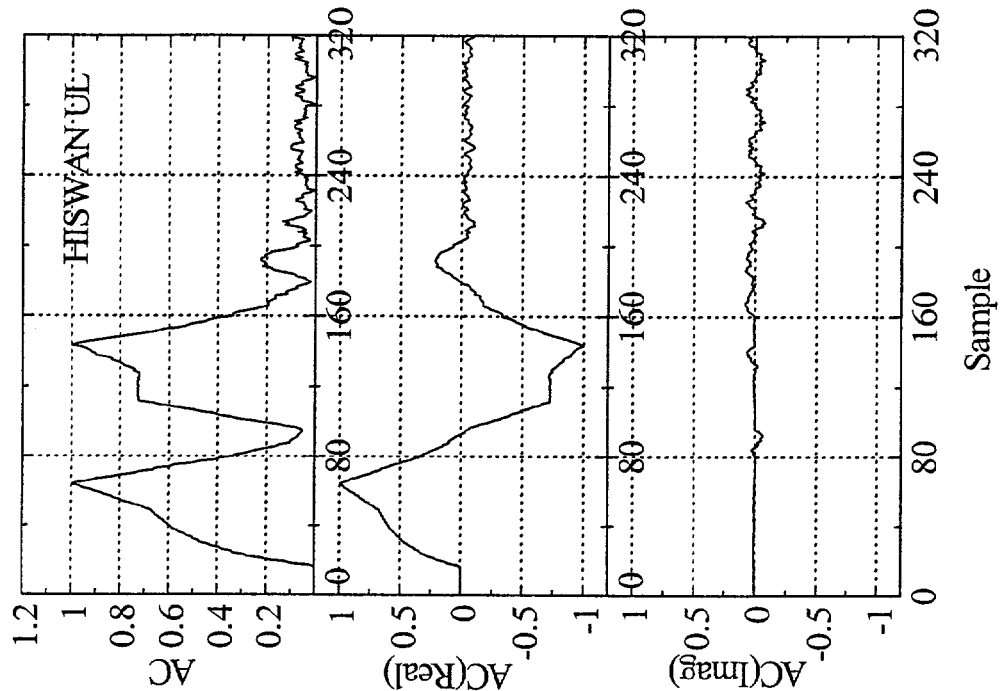
FIGS. 14A and 14B are schematic diagrams showing waveforms of the correlation device output with respect to each reference symbol.
Figure 14A:
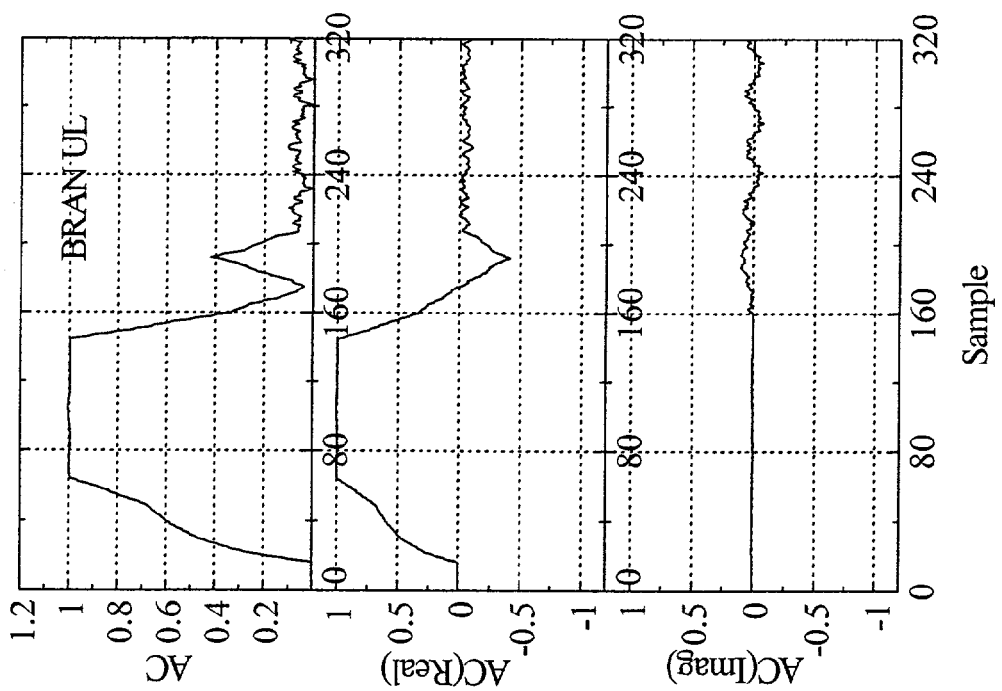
Figure 16:
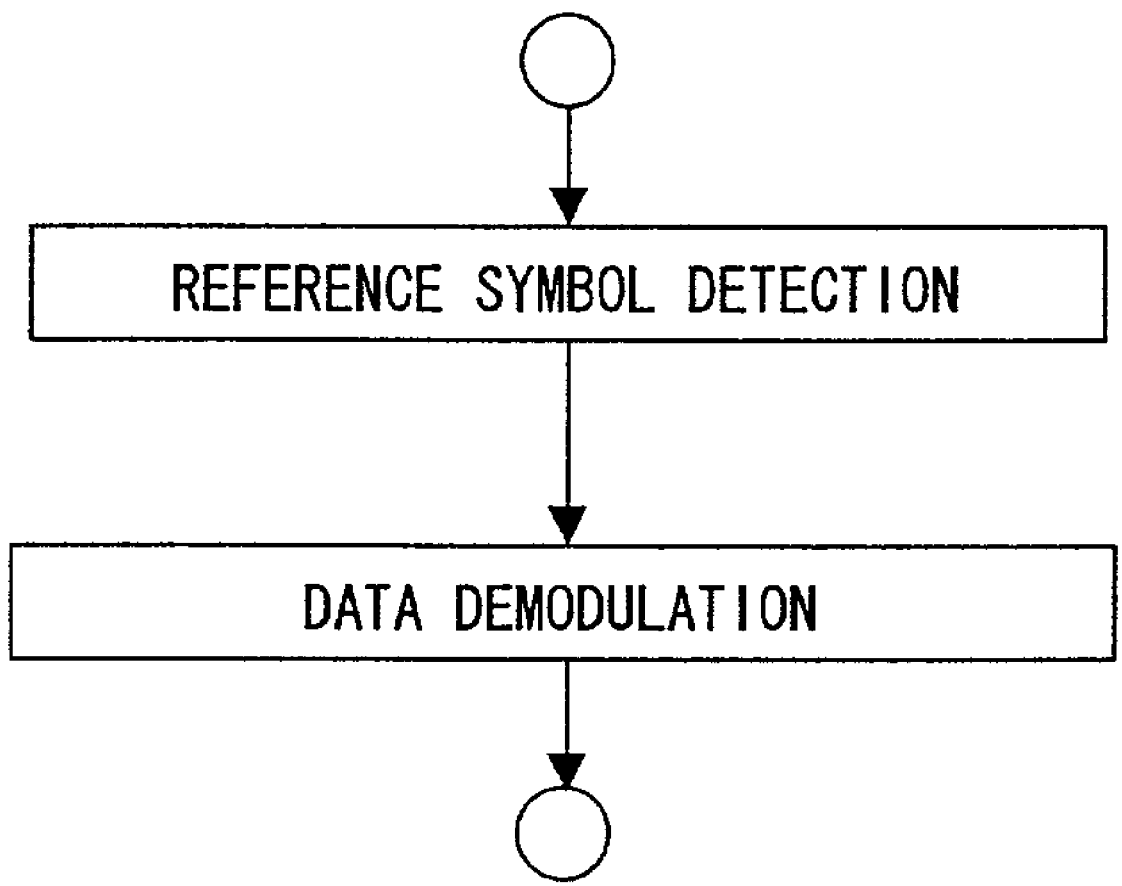
FIG. 16 is a schematic diagram showing a flow of the general synchronizing operation and the OFDM demodulation operation.

As described above in FIG. 12, in the correlation circuit, since output waveforms of the correlators are different each other as described above in FIG. 19, FIG. 22 and FIG. 13B when the reference symbol for frame synchronization (1) of the wireless home link and the reference symbol for packet synchronization (2) and the reference symbol for frame synchronization of the BRAN system are entered, the leaf station 202, by distinguishing the waveform described above in FIG. 19, can know the timing of frame boundary of the network to which it should enter correctly.

Hereinafter, the control information transmitted from the control station 201 can be demodulated at the predetermined timing according to the OFDM system and data exchange can be conducted.

On the other hand, since terminals of the BRAN, high speed wireless access and IEEE802.11a can distinguish the reference symbol for frame synchronization and the reference symbol for packet synchronization of the wireless home link, they can receive signals mutually between different systems. However, they just detect the correlation of the reference symbol that exists at the start of the signal, they can judge whether the signal is the signal that they should demodulate or not.

By demodulating the signal that is necessary for itself, the operation of the receiver becomes simple and the power consumption will be reduced, and the occurrence of erroneous operation of the system and mutual interference can be reduced.

(6) Operation and Effects of the Present Embodiment

According to the foregoing construction, in the digital communication system, in the transmitter, after switching the sync pattern in which reference symbol is phase-shifted to the other sync pattern of the same reference symbol and will be transmitted to the cyclic expansion insertion circuit 14 from the sync pattern phase-shift circuit 40. And in the cyclic expansion insertion circuit, after inserting the reference symbols of the series (1) containing the structure of "IA-A-IA-A-A-IA-A-IA-IA" and/or the series (2) containing the structure of "IB-IB-IB-IB-B-B-B-B-IB" into the transmission data, that transmission data will be transmitted.

Accordingly, in this digital communication system, since the reference symbol having patterns different from the reference symbol is used in all conventional digital communication systems, the frame sync code series and/or the packet sync code series can be certainly identified.

Moreover, since the reference symbols will be generated by using the series A, series B and the series C to be obtained by the IFFT, the digital communication system can be identified by using the same correlation circuit as the conventional digital communication system. In addition to this, since the common circuit can be used when forming the shared device of the TEEE802.11a and the wireless home link by using the same LSI, this is very convenient. And also the unit price reduction due to the cost curtailment of the terminal parts and the effects of mass production of LSI can be expected.

According to the foregoing construction, in the transmitter, switching the sync pattern in which the phase of reference symbol is shifted, and the other sync pattern of the same reference symbol and the reference symbol of the series (1) containing the structure "IA-A-IA-A-A-IA-A-IA-IA" and/or the series (2) containing the structure of "IB-IB-IB-IB-B-B-B-B-IB" are generated, and these are inserted into the transmission data and to be transmitted, the frame sync code series and/or the packet sync code series can be certainly identified because the reference symbol having the pattern different from the reference symbol used in all conventional digital communication systems. Thus, even when different communication systems exist mixed, the sync signal of the communication system in use can be certainly detected.

(7) Other Embodiments

The embodiment described above has dealt with the case of using the reference symbol of the series (1) and the series (2) in the digital communication system of the OFDM system. However, the present invention is not only limited to this but also the reference symbol can be used as the sync signal of the radio communication system and the general digital communication system. And in this case the same effects as those of the embodiment described above can be obtained. Moreover, it can be also used as sync signal in all radio communication systems not only in the digital communication system of 5 GHz band.

Furthermore, the embodiment described above has dealt with the case of using the IFFT of 64 points. However, the present invention is not only limited to this but also the IFFT of other point number such as 256 points can be used. And in this case, the same effects as those of the embodiment described above can be obtained.

Furthermore, the embodiment described above has dealt with the case of forming the phase structure of the sync pattern of the reference symbol using the series A as "IA-A-IA-A-A-IA-A-IA-IA-C". However, the present invention is not only limited to this but also the data series of which the phase is completely inverted "A-IA-A-IA-IA-A-IA-A-A-C", or as shown in FIGS. 34A and 34B, "IA-A-IA-A-A-IA-A-IA-IA-X-C", "X-IA-A-IA-A-A-IA-A-IA-IA-C" (where X shows an optional series such as A or IA) can be used.

Furthermore, the embodiment described above has dealt with the case of making the phase structure of the sync pattern of the reference symbol using the series B as "IB-IB-IB-IB-B-B-B-B-IB-C". However, the present invention is not only limited to this but also the data series of which phase is completely inverted "B-B-B-B-IB-IB-IB-IB-B-C" or, as shown in FIGS. 35A and 35B, "IB-IB-IB-IB-B-B-B-B-X-C", "X-IB-IB-IB-IB-B-B-B-B-IB-C" (where X shows an optional series such as B or IB) can be used.

Moreover, the embodiment described above has dealt with the case of making the data series of C domain as "C16-C64-C64". However, the present invention is not only limited to this but also various combined data series such as "C32-C64-C64", "C32-C64", or "C16-C64" and "C8-C64-C64", and also "C8-C64" can be used as the data series of the C series.

Furthermore, according to the embodiment described above, the subcarrier of the series A has the value in every $(4*i+2)$ order, making i as integer. More specifically, this becomes "$-22,-18,\ldots,-2,+2,+6,\ldots,+22$", or "$-26,-22,-28,\ldots,-2,+2,+6,\ldots,+22,+26$". If these coefficients are entered into the IFFT, output waveforms of the IFFT always become the form of "A-IA-A-IA". Accordingly the value of SA of the series (1) is not only limited to the value described in EQUATION (4), but also the one that has the value every $(4*i+2)$ order can be acceptable.

Furthermore, according to the embodiment described above, subcarrier of the series B has the value every $(4*i)$ order making i as integer except 0. More specifically, this becomes "$-24,-20,\ldots,-4,+4,+8,\ldots,+24$". If such coefficients are entered into the IFFT, the output waveform becomes always in the form of "B-B-B-B". Accordingly, the value of SB of the series (2) can be the value that has the value every $(4*i)$ order not only the EQUATION (5) described above. In addition, the sub-carrier of the series B can be the one that has the value every $(8*i)$ order, that is "$-24,-16,-8,+8,+16+24$" can be used.

According to the present invention as described above, since the transmission data is encoded to the data symbol, the reference symbols in which multiple sync patterns A and the phase-shifted sync pattern A, i.e., sync pattern IA, are aligned in time series in order to contain the structure of "IA-A-IA-A-A-IA-A-IA-IA" is inserted to the data symbol, and the data symbol in which the reference symbols are inserted is to be modulated to the radio frequency signal, the correlation detection pattern remarkably different from the correlation detection pattern of all conventional sync code series can be obtained. Thereby, when different communication systems exist mixed, the synchronizing signal of the communication system in use can be detected certainly.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data modulation method comprising the steps of:
   encoding transmission data into a data symbol;
   inserting into said data symbol a reference symbol in which multiple synchronizing patterns are aligned in a time series in order to contain a structure of

IA-A-IA-A-A-IA-A-IA-IA (where: A is a synchronizing pattern and IA is a phase-shifted synchronizing pattern obtained by phase shifting A), said reference symbol producing a waveform output having only two peaks when said reference symbol is input to a correlator of a receiver, thereby producing a distinguishable waveform pattern from other waveform patterns produced by other communication systems; and modulating the data symbol in which said reference symbol is inserted with radio frequency signals.

2. The data modulation method according to claim 1, wherein said step of modulating the data symbol comprises conducting the modulation according to an orthogonal frequency division multiplexing (OFDM) system.

3. A data modulation method comprising the steps of:
encoding transmission data into a data symbol;
inserting into said data symbol a reference symbol in which multiple synchronizing patterns are aligned in a time series to contain a structure of

A-IA-A-IA-IA-A-IA-A-A (where: A is a synchronizing pattern and IA is a phase-shifted synchronizing pattern obtained by phase shifting A), said reference symbol producing a waveform output having only two peaks when said reference symbol is input to a correlator of a receiver, thereby producing a distinguishable waveform pattern from other waveform patterns produced by other communication systems; and modulating the data symbol in which said reference symbol is inserted with radio frequency signals.

4. The data modulation method according to claim 3, wherein said step of modulating the data symbol comprises conducting the modulation according to an orthogonal frequency division multiplexing (OFDM) system.

5. A data modulation method comprising the steps of:
encoding transmission data into a data symbol;
inserting into said data symbol a reference symbol in which multiple synchronizing patterns are aligned in a time series in order to contain a structure of

IB-IB-IB-IB-B-B-B-B-IB (where: B is a synchronizing pattern and IB is a phase-shifted synchronizing pattern obtained by phase shifting B) into said data symbol, said reference symbol producing a waveform output having only two peaks when said reference symbol is input to a correlator of a receiver, thereby producing a distinguishable waveform pattern from other waveform patterns produced by other communication systems; and modulating the data symbol in which said reference symbol is inserted with radio frequency signals.

6. The data modulation method according to claim 5, wherein said step of modulating the data symbol comprises conducting the modulation according to an orthogonal frequency division multiplexing (OFDM) system.

7. A data modulation method comprising the steps of:
encoding transmission data in a data symbol;
inserting into said data symbol a reference symbol into which multiple
synchronizing patterns are aligned in a time series in order to contain a structure of

B-B-B-B-IB-IB-IB-IB-B (where: B is a synchronizing pattern and IB is a phase-shifted synchronizating pattern obtained by phase shifting B), said reference symbol producing a waveform output having only two peaks when said reference symbol is input to a correlator of a receiver, thereby producing a distinguishable waveform pattern from other waveform patterns produced by other communication systems; and modulating the data symbol in which said reference symbol is inserted with radio frequency signals.

8. The data modulation method according to claim 7, wherein said step of modulating the data symbol comprises conducting the modulation according to an orthogonal frequency division multiplexing (OFDM) system.

9. A data modulation device comprising:
encoding means for encoding transmission data into a data symbol;
reference symbol insertion means for inserting into said data symbol a reference symbol in which multiple synchronizing patterns are aligned in a time series in order to contain a structure of

IA-A-IA-A-A-IA-A-IA-IA (where, A is a synchronizing pattern and IA is a phase-shifted synchronizing pattern obtained by phase shifting A), said reference symbol producing a waveform output having only two peaks when said reference symbol is input to a correlator of a receiver, thereby producing a distinguishable waveform pattern from other waveform patterns produced by other communication systems; and modulation means for modulating the data symbol in which said reference symbol is inserted with a wireless frequency signal.

10. A data modulation device comprising:
encoding means for encoding transmission data into a data symbol;
reference symbol insertion means for inserting into said data symbol a reference symbol in which multiple synchronizing patterns are aligned in a time series in order to contain a structure of

IB-IB-IB-IB-B-B-B-B-IB (where, B is a synchronizing pattern and IB is a phase-shifted synchronizing pattern obtained by phase shifting B), said reference symbol producing a two peak waveform output having only two peaks when said reference symbol is input to a correlator of a receiver, thereby producing a distinguishable waveform pattern from other waveform patterns produced by other communication systems; and modulation means for modulating the data symbol in which said reference symbol is inserted.

11. A communication device comprising:
encoding means for encoding transmission data into a data symbol;
reference symbol insertion means for inserting into said data symbol a reference symbol in which multiple synchronizing patterns are aligned in time series in order to contain the structure of

IA-A-IA-A-A-IA-A-IA-IA (where: A is a synchronizing pattern and IA is a phase-shifted synchronizing pattern obtained by phase shifting A), said reference symbol producing a waveform output having only two peaks when said reference symbol is input to a correlator of a receiver, thereby producing a distinguishable waveform pattern from other waveform patterns produced by other communication systems;

modulation means for modulating the data symbol in which said reference symbol is inserted with a radio frequency signal;

an antenna for receiving/transmitting a modulated signal; and synchronization detection means for obtaining a correlation value between the reference symbol of the modulated signal received and a delayed reference symbol and detecting a synchronization.

12. A communication device comprising:

encoding means for encoding transmission data into a data symbol;

reference symbol insertion means for inserting into said data symbol a reference symbol in which multiple sync patterns are aligned in a time series in order to include a structure of

IB-IB-IB-IB-B-B-B-B-IB (where, B is a synchronizing pattern and IB is a phase-shifted synchronizing pattern obtained by phase shifting B), said reference symbol producing a waveform output having only two peaks when said reference symbol is input to a correlator of a receiver, thereby producing a distinguishable waveform pattern from other waveform patterns produced by other communication systems;

modulation means for modulating the data symbol in which said reference symbol is inserted with a radio frequency signal;

an antenna for receiving/transmitting a modulated signal; and synchronization detection means for obtaining a correlation value between the reference symbol of a modulated signal received and a reference symbol delayed and detecting synchronization.

* * * * *

UNITED STATES PATENT AND TRADEMARK OFFICE
CERTIFICATE OF CORRECTION

| | | |
|---|---|---|
| PATENT NO. | : 7,106,821 B2 | Page 1 of 1 |
| APPLICATION NO. | : 09/804744 | |
| DATED | : September 12, 2006 | |
| INVENTOR(S) | : Takashi Usui et al. | |

It is certified that error appears in the above-identified patent and that said Letters Patent is hereby corrected as shown below:

<u>Title Page</u> Item (57)

The Abstract should read --A data modulation method and a data modulation device and a communication device are provided in which a reference symbol is optimized in order to contain the structure of "IA-A-IA-A-A-IA-A-IA-IA" and is allocated to sub-carriers of an OFDM symbol. More specifically, by designing the structure of a preamble of the time domain, distinction from other communication systems is achieved along with clock synchronization. Also, a series having a low peak average ratio and a dynamic range has been adopted for the sync symbol used in the OFDM. Since generation and detection processing can be conducted utilizing a generation device and a detection device of the sync preamble used in a conventional system, this system has an advantage in increasing the common use of an LSI chip. The sync series is divided into 2 parts, A and B, rather than to one B region and has a simple construction.--

Column 10, Line 39, "Flow" should read --$F_{pow}$--;

Column 13, Line 21, "TEEE802" should read --IEEE802--

Signed and Sealed this

Twenty-first Day of August, 2007

JON W. DUDAS
*Director of the United States Patent and Trademark Office*